(12) United States Patent
Lumbatis et al.

(10) Patent No.: US 11,212,035 B2
(45) Date of Patent: Dec. 28, 2021

(54) SYSTEMS AND METHODS FOR ASSESSING WI-FI COVERAGE FOR CLIENT DEVICES IN A MULTI-ACCESS POINT ENVIRONMENT

(71) Applicant: ARRIS Enterprises LLC, Suwanee, GA (US)

(72) Inventors: Kurt A. Lumbatis, Dacula, GA (US); Navneeth N. Kannan, Doylestown, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 40 days.

(21) Appl. No.: 16/946,255

(22) Filed: Jun. 12, 2020

(65) Prior Publication Data
US 2020/0396019 A1 Dec. 17, 2020

Related U.S. Application Data

(60) Provisional application No. 62/861,866, filed on Jun. 14, 2019, provisional application No. 62/943,751, (Continued)

(51) Int. Cl.
*H04L 1/00* (2006.01)
*H04W 24/10* (2009.01)
(Continued)

(52) U.S. Cl.
CPC ......... *H04L 1/0026* (2013.01); *H04B 17/336* (2015.01); *H04L 1/0005* (2013.01); *H04W 24/10* (2013.01); *H04W 64/006* (2013.01)

(58) Field of Classification Search
CPC ... H04W 16/26; H04W 72/085; H04W 36/30; H04W 16/18; H04W 24/04; H04W 36/04;
(Continued)

(56) References Cited

U.S. PATENT DOCUMENTS 7,158,790 B1 1/2007 Elliott
8,260,322 B2 9/2012 Allen et al.
(Continued)

FOREIGN PATENT DOCUMENTS

EP 3 010 274 A1 4/2016

OTHER PUBLICATIONS

Notification of Transmittal of the International Search Report (Form PCT/ISA/220 and PCT/ISA/210) and the Written Opinion of the International Searching Authority (Form PCT/ISA/237) dated Sep. 11, 2020, by the International Application Division Korean Intellectual Property Office in corresponding International Application No. PCT/US2020/037442. (12 pages).

*Primary Examiner* — Kwasi Karikari
(74) *Attorney, Agent, or Firm* — Buchanan, Ingersoll & Rooney, PC

(57) ABSTRACT

A communication interface receives data points including link quality and link usage measurements related to a mobile computing device associated with the wireless network during a sampling interval. A processing device weights each data point based on at least one metric included in the link quality measurement and associated with a link usage measurement. Each weighted data point is evaluated against one or more thresholds. A weighted data point is discarded based on a result of the threshold comparison or assigned to one of a plurality of link quality bins based on a consolidated measure of the link quality measurements. A coverage quality score is computed based on a ratio of a total count of weighted link quality measurements in at least one of the plurality of link quality bins to a total count of weighted link quality measurements in all of the link quality bins.

20 Claims, 13 Drawing Sheets

Related U.S. Application Data filed on Dec. 4, 2019, provisional application No. 62/967,805, filed on Jan. 30, 2020.

(51) Int. Cl.
*H04W 64/00* (2009.01)
*H04B 17/336* (2015.01)

(58) Field of Classification Search
CPC ..... H04W 48/18; H04W 8/005; H04W 28/24; H04W 36/03; H04W 36/14; H04W 36/165; H04W 16/14; H04W 16/20; H04W 40/12; H04W 48/06; H04W 52/20; H04W 52/242; H04W 52/243; H04W 52/283; H04W 52/285; H04W 72/06; H04W 72/10; H04W 72/1226
See application file for complete search history.

(56) References Cited

U.S. PATENT DOCUMENTS

| | | |
|---|---|---|
| 2016/0192243 A1 | 6/2016 | Egner et al. |
| 2017/0135022 A1 | 5/2017 | Amini et al. |

| STA | Active | Initial Values | | | | | Weighted Score | Total Byte Count For Sample Period | BINS | | | | | | | | | |
|---|---|---|---|---|---|---|---|---|---|---|---|---|---|---|---|---|---|---|
| | | Bytes Since Last Sample | Last Byte Count | CQIScore Cumulative Byte Count | NumberOfM CSMeasure ments | Reported MCS | Reported Bytes | | | 0 | 1 | 2 | 3 | 4 | 5 | 6 | 7 | 8 | 9 |
| | | 0 | 0 | 0 | 0 | 0 | 0 | | | | | | | | | | | | |
| | | Sample 1 Bytes per 10 Seconds --> Sample Byte Count | | | | | | | | | | | | | | | | | |
| | | | | | | | 125,000,000 | | | | | | | | | | | | |
| 1 | 1 | 125,000,000 | 125,000,000 | 125,000,000 | 1 | 6 | 125,000,000 | 100000.00 | | 0.00 | 0.00 | 0.00 | 0.00 | 0.00 | 0.00 | 100000.00 | 0.00 | 0.00 | 0.00 |
| 1 | 1 | 125,000,000 | 250,000,000 | 250,000,000 | 2 | 5 | 250,000,000 | 100000.00 | | 0.00 | 0.00 | 0.00 | 0.00 | 0.00 | 100000.00 | 0.00 | 0.00 | 0.00 | 0.00 |
| 1 | 1 | 125,000,000 | 375,000,000 | 375,000,000 | 3 | 6 | 375,000,000 | 100000.00 | | 0.00 | 0.00 | 0.00 | 0.00 | 0.00 | 0.00 | 100000.00 | 0.00 | 0.00 | 0.00 |
| 1 | 1 | 125,000,000 | 500,000,000 | 500,000,000 | 4 | 7 | 500,000,000 | 100000.00 | | 0.00 | 0.00 | 0.00 | 0.00 | 0.00 | 0.00 | 0.00 | 100000.00 | 0.00 | 0.00 |
| 1 | 1 | 125,000,000 | 625,000,000 | 625,000,000 | 5 | 8 | 625,000,000 | 100000.00 | | 0.00 | 0.00 | 0.00 | 0.00 | 0.00 | 0.00 | 0.00 | 0.00 | 100000.00 | 0.00 |
| 1 | 1 | 125,000,000 | 750,000,000 | 750,000,000 | 6 | 7 | 750,000,000 | 100000.00 | 750,000,000 | 0.00 | 0.00 | 0.00 | 0.00 | 0.00 | 0.00 | 0.00 | 100000.00 | 0.00 | 0.00 |

FIG. 10A

SYSTEMS AND METHODS FOR ASSESSING WI-FI COVERAGE FOR CLIENT DEVICES IN A MULTI-ACCESS POINT ENVIRONMENT

FIELD

The present disclosure relates to determining quality of coverage in a wireless local area network.

BACKGROUND

The described embodiments relate to techniques used in communicating information among electronic devices in a multiple access point (multi-AP) wireless local area network environment, including measurement and assessment of coverage for wireless clients during wireless communication via the wireless local area network.

Many electronic devices are capable of wirelessly communicating with other electronic devices. For example, these electronic devices can include a networking subsystem that implements a network interface for: a cellular network (UMTS, LTE, etc.), a wireless local area network or WLAN (e.g., a wireless network such as described in the Institute of Electrical and Electronics Engineers (IEEE) 802.11 standard, Bluetooth (from the Bluetooth Special Interest Group of Kirkland, Wash.), and/or another type of wireless network.

In a wireless network based on an IEEE 802.11 standard, e.g., a Wi-Fi network, an electronic device often actively scans for a nearby operating access point ("AP"). In a crowded wireless environment, there may be multiple access points within communication range of the electronic device.

For example, wireless communication has become ubiquitous in the home, with most of the devices in the home needing connectivity to the Internet, and their primary connection to the main router or gateway in the home is via Wi-Fi. The explosion in the number of such devices in the home is driven by not only the smartphones, but also the nascent but increasing devices under the umbrella of IoT (Internet of Things).

Known solutions for assessing coverage quality focus on parametric (or real-life testing) typically having a single AP in mind, for comparison reasons. One known measurement concept is the use of a Wi-Fi Test House, with tests run by third parties, replicating conditions inside a home and using different clients to test real-life performance for a given gateway. Still, these tests are focused on comparing relative performance of a device from build-to-build, or to compare two (or more) devices.

With an increasing number of Wi-Fi clients in a typical residence, as well as the nature of certain clients necessarily having to be at the edges of the home (such as webcams outside the home garage door), the use of multiple APs in the home is becoming increasingly common.

One of the key performance indicators for a wireless network is a concept of "coverage", which, as generally used, is an intuitive term that reflects, for example, the ability of a gateway or router in the home to be able to handle the throughput requirements for any given Wi-Fi client, independent of its location or mobility.

Known parametric measures that are used to assess the capability of a gateway (e.g., an access point or AP) include, for example:

RvR (Rate versus Range) measurements;
RvO (Rate versus Orientation) measurements; and
TIS/TRP measurements.

RvR (Rate versus Range) measurements are done in both controlled and "over the air" (OTA) environments. These tests assess the data throughput capability of an Access Point (AP) using a standard client, and by varying the relative position of the client, either through simulated means such as an attenuator in the case of a controlled environment, or through distance (and amid multiple obstacles such as walls, objects etc.) in a real-home environment.

RvO (Rate versus Orientation) measurements are done in both controlled and OTA environments, these tests are aimed at assessing the relative throughput performance at different angles relative to the placement of the AP and client.

TIS/TRP measurements, using Rhode-Schwartz methodology, test and analyze the uniformity of the radiated power (indicative of transmission throughput from AP to STA) and isotropic sensitivity (indicative of reception from STA to AP) in a spherical radiation pattern.

While the foregoing three tests are highly valuable in assessing relative performance across different APs, or different software versions for the same AP, and while they do indeed provide leading indication of the ability of a device to provide coverage across Range (through RvR testing), across different orientations (RvO testing) and consistency of performance independent of location (TIS/TRP), they do not necessarily translate into real-life, leading to throughput measurement techniques over-the-air using testing in a "home" setting.

With the advent of multi-AP network environments in the home, there is a need for better ways to understand and measure performance in the presence of additional access points. For example, in environments having multiple access points and a high density of client wireless devices, a high client density can lead to lower network capacity for data. Sub-optimal client-to-AP association can lead to lower throughput for the clients. Factors such as these have created, for example, a need for client steering mechanisms, and for improved coverage measurement techniques that take steering into account.

An illustrative set of practical needs may be characterized by the following questions, raised from the exemplary perspective of a multiple systems operator (MSO):

For the clients being served in a given home, is there adequate coverage? More specifically, assuming capable clients, does the Wi-Fi coverage appear adequate?

How do I know if there is a need for an extender?

How do I know if the coverage has become better with the extender(s), and to what extent?

In existing Wi-Fi deployments, very little information is 'known' about the signal being received at a non-AP STA device. The reason for this is that most devices don't support methods for reporting the signal being received at its location from the AP. Protocol elements are defined in the IEEE 802.11 standard as will be discussed in the following sections. However, most low-cost STA devices don't implement these methods. One additional problem is that, even when available, some known methods waste valuable Wi-Fi bandwidth in their implementation. Additional methods currently in use have other shortfalls.

IEEE 802.11—Link Measurement

The 802.11k amendment as part of its radio resource measurement specified a Link Measurement Request/Report pair. These requirements are defined in IEEE 802.11-2016 in sections 9.6.7.5 and 9.6.7.4. The Link Measurement Request allowed an AP to query a STA device as to the received radio metrics it its location. The Link Measurement Report was the STA's response to the Link Measurement Request and contains two important pieces of information:

RCPI—indicating the received channel power at the STA of the corresponding Link Measurement Request frame.

RSNI—indicating the received signal to noise ratio at the STA when the Link Measurement Request frame was received.

These two pieces of information quantify the quality of the signal at the STA's location. Sadly, however, very few devices or APs ever implemented support for the Link Measurement Request/Response. This method also suffers from the inaccuracy of the values being reported from the STA devices, as most of these devices do not accurately calibrate the receive RF paths. This method does however, allow for an estimation of MIMO characteristics of the network, if the frame is transmitted as a non-basic-rate transmission. Thus, these measurements can be utilized only as an indication of the signal strength at the STA from an AP.

IEEE 802.11—Beacon Report

The 802.11k amendment also added the radio resource measurement capability of a Beacon Request/Report. The Wi-Fi Alliance (WFA) recently codified these measurements as part of their EasyMesh™ Protocol.

The purpose of these measurements is to allow an AP to request from the STA a measurement of the received signal strength of Beacon Frames (passive scan) or Probe Response Frames (active scan) received by the STA from all APs it 'hears'.

BSSID—Indicating the MAC Address from which the signal was received.

RCPI—indicating the received channel power at the STA of a Beacon or Probe Response Frame received from a particular BSSID (AP).

RSNI—indicating the received signal to noise ratio at the STA when the Beacon or Probe Response frame was received from a particular BSSID (AP).

These pieces of information quantify the quality of the signal at the STA's location for received Beacons or Probe Responses. But once again these measurements suffer from a lack of receiver calibration and understanding of MIMO characteristics of data frames at its particular location since Beacons and Probe Responses are 802.11 management frames and thus are non-MIMO frames, typically transmitted with a very robust modulation type. Additionally, known methods must rely upon knowledge of the connection point of the STA (BSSID) in order to determine the link point from the various BSSIDs it reports. Thus, although the report is useful in some respects, it is not useful as a tool to measure network coverage.

Upstream Signal Strength and Noise Floor

The most common method currently in use to determine coverage in a network is to assess the RSSI or RCPI of a STAs transmission to its AP. This method allows the network to assess the coverage in the network based on a received signal strength from a STA at the AP. The Wi-Fi Alliance (WFA) has codified these measurements in the Data Elements Specification. Utilization of upstream signal strength and noise floor measurements present various problems.

1) Mobile devices or clients typically have lower transmission powers than the APs to which they are connected.

2) Most APs do not calibrate the receive signal strength, thus the actual received signal strength, (RSSI or RCPI) may be in error by several decibels. (dB)

3) The antenna on which the signal is received may have differing path losses and since most upstream traffic from connected STAs are control frames (Acknowledgement or Block Acknowledgement) which are typically transmitted at Basic Rates utilizing signal replication across multiple antennae (when available), the received signal strength may vary greatly from the same connected device at the same location between transmissions.

4) It is an indication of the signal FROM the connected device, not an indication of the signal TO the connected device FROM the AP. Thus, this method, although viable, doesn't give a true indication of the coverage quality AT the receiving device FROM the AP.

5) This method also cannot account for differing channel noise characteristics at the STA location. Think of a Baby Monitor in a bedroom which doesn't affect the AP as much as the STA in the room with the monitor.

For these reasons, utilizing the upstream signal strength and noise floor values is not truly a viable measure of the coverage of a network, only of the power of the STA device.

Downstream Data Link Rate

Downstream Link Rate is an existing method which assesses downstream link rate to individual devices in a network. Individual devices are tracked via downstream link rate (typically in Kbps or Mbps) and assessed for how well Wi-Fi is covering the devices in the network. Several problems are apparent in this method:

1. The STA MIMO capabilities need to be tracked on a per connected device basis and the actual transmission data rate compared with the device's MIMO capabilities, channel bonding utilized for the transmission, and transmission characteristics (preamble type, modulation type, etc.) in order to compare the capabilities of the client device versus what is actually being transmitted to the device.

2. Downstream Link Rate requires data to be passed and averaged on a consistent basis.

3. It is impossible to know if data has been passed to the device during the measurement interval, or if this was a 'latched' value from a previous transmission.

4. The score must be averaged and stored based on varying transmission rates and possibly changing transmission type (short vs. long preambles, channel widths, MIMO vs STBC mode, PER, etc.).

SUMMARY

An exemplary method for determining quality of coverage in a wireless network is disclosed, comprising: receiving data points, in a communication interface of a computing device, the data points comprising link quality and link usage measurements related to a mobile computing device associated with the wireless network during a sampling interval; weighting, in the processing device of the computing device, each data point based on at least one metric included in the link quality measurements and associated link usage measurement; evaluating, in the processing device of the computing device, each weighted data point against one or more thresholds, wherein a weighted data point is discarded based on a result of the threshold comparison or assigned to one of a plurality of link quality bins based on a consolidated measure of the link quality measurements; and computing, in the processing device of the computing device, a coverage quality score based on a ratio of a total count of weighted data points in at least one of the plurality of link quality bins to a total count of weighted data points in all of the link quality bins.

An exemplary system for determining quality of coverage in a wireless local area network, comprising: a communication interface configured to receive data points comprising link quality and usage measurements related to a mobile computing device associated with the wireless network during a sampling interval; and a processing device configured to: weight each data point based on at least one metric included in the link quality measurement and associated with a link usage measurement; evaluate each weighted data point against one or more thresholds, wherein a weighted data point is discarded based on a result of the threshold comparison or assigned to one of a plurality of link quality bins based on a consolidated measure of the link quality measurements; and compute a coverage quality score based on a ratio of a total count of weighted link quality measurements in at least one of the plurality of link quality bins to a total count of weighted link quality measurements in all of the link quality bins.

BRIEF DESCRIPTION OF THE DRAWINGS

FIGS. 10A-10C illustrate CQ data tables and measurement histograms in accordance with an exemplary embodiment of the present disclosure.

DETAILED DESCRIPTION

Figure 1:
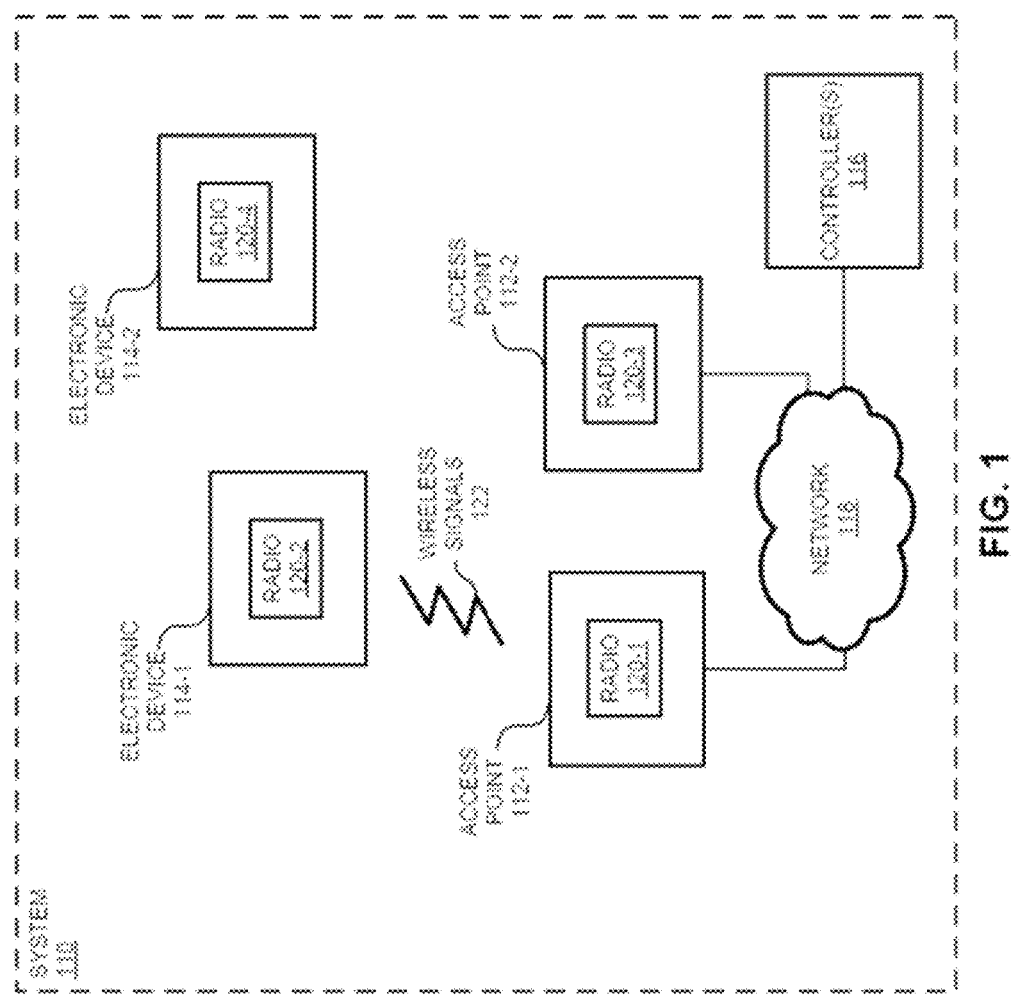
FIG. 1 presents a block diagram illustrating an example of a system according to an exemplary embodiment of the present disclosure.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Exemplary embodiments of the present disclosure provide a system and method for Wi-Fi coverage quantification and assessment using an adaptive coverage quality metric. The disclosed solution relates to real-world experience, is adaptive, and takes into account the mobile nature of the client. Aspects of the present disclosure are able to provide a solution specific to the subscriber, and to the home, rather than known and more generalized metrics, which can be associated with one or more devices connected to a home Wi-Fi network.

Exemplary embodiments of the present disclosure further provide actionable data that an MSO, for example, can use to provide answers or solutions along the lines of the following examples:

The Wi-Fi coverage inside the home is adequate, where the MSO may be able to highlight the capability, or lack thereof, of specific Wi-Fi clients.

The Wi-Fi coverage in the home may not be adequate for one or more devices based on the movement (or location) of such devices. As a result, an extender or additional extender can be suggested.

Relate to the subscriber that since the addition of the extender, there is quantifiable improvement in the performance, validating the addition.

Exemplary embodiments of the present disclosure are directed to systems and methods for computing a coverage quality (CQ)-Score that accounts for the dynamic behavior of a wireless computing device across multiple Access Points (AP) of a local area network (LAN). According to an exemplary embodiment of the present disclosure, the system learns about the mobility of a client device from the dynamic nature of the device's position, which is reflected by mutual measurement and assessment of signal strengths. The system is configured to build a dynamic range map, by predicting transient extremes of a client device and providing a view of the range of coverage inside a home based on a location profile of the client device inside the home. Transient extremes can include activities when the wireless signal is too weak to be recognized such as when a mobile device is moving in a direction towards a boundary (e.g., edge) of the coverage area or the device is disconnected from the network for a period of time. According to an exemplary embodiment of the present disclosure, data points associated with the transient extremes can be ignored when computing the CQ-score so that they do not affect the overall coverage quality (CQ) measurement.

According to an exemplary embodiment, the coverage quality score is an intuitive "score" that is representative of the expected experience of the Wi-Fi clients that are connected to a Wi-Fi network in a specific home. The characteristics of such a score, in various embodiments, include the following aspects:

An exemplary system and method that takes into account the various devices that connect to the Access Points on a regular basis.

An exemplary system and method that learns about the mobility of the device by taking into account the dynamic nature of its position, reflected by the mutual assessment of signal strengths. This is done by building a "dynamic range map", predictive of the location profile inside the home. Note that this is not a geographical location as much as it is a view of the range of coverage. It grooms this data by predicting "transient extremes" such as seen when a mobile device is on the way to going out of range (or being turned off). For instance, someone leaving the home with their mobile device (e.g., mobile phone) will continue to have access for some distance until such a time when the Wi-Fi signal is too weak to be recognized. This data point has to be ignored, since it is a transient that cannot affect the measurement.

An exemplary system and method that applies the concept of a "data-usage mask" to add weight to the "dynamic range map" produced above. This is an improvement over known techniques, in the sense that if a particular device is kept at a particular place at night (and that turns out to be low-coverage area) but then is associated with low/no data usage, then the importance of that particular data point should be set lower.

An exemplary system and method that is able to learn about the temporal behavior of the device, in terms of a 24-hour period, to detect patterns associated with specific times of the day. Two sets of such data are relevant, one for weekdays and another for weekends.

An exemplary system and method that provides the coverage quality score or CQ-Score, which is a novel metric based on one or more of the temporal behavior, data usage, and dynamic movement of one or more mobile devices connected to a Wi-Fi network. The CQ-Score begin suitable for measuring mobile devices within a small range.

Deployment Environments and Devices

In the discussion that follows, electronic devices or components in a system communicate packets in accordance with a wireless communication protocol, such as: a wireless communication protocol that is compatible with an IEEE 802.11 standard (which is sometimes referred to as "Wi-Fi®," from the Wi-Fi Alliance of Austin, Tex.), Bluetooth® (from the Bluetooth Special Interest Group of Kirkland, Wash.), and/or another type of wireless interface (such as another wireless-local-area-network interface). Moreover, an access point in the system may communicate with a controller or services using a wired communication protocol, such as a wired communication protocol that is compatible with an Institute of Electrical and Electronics Engineers (IEEE) 802.3 standard (which is sometimes referred to as "Ethernet"), e.g., an Ethernet II standard. However, a wide variety of communication protocols may be used in the system, including wired and/or wireless communication. In the discussion that follows, Ethernet and Wi-Fi are used as illustrative examples.

FIG. 1 is a block diagram illustrating an exemplary system 110, which may include components, such as: one or more access points 112, one or more electronic devices 114 (such as cellular telephones, stations, another type of electronic device, etc.), and one or more optional controllers 116. In system 110, the one or more access points 112 may wirelessly communicate with the one or more electronic devices 114 using wireless communication that is compatible with an IEEE 802.11 standard. Thus, the wireless communication may occur in a 2.4 GHz, a 5 GHz and/or a 60 GHz frequency band. (Note that IEEE 802.11ad communication over a 60 GHz frequency band is sometimes referred to as "WiGig." In the present discussion, these embodiments also encompassed by "Wi-Fi.") However, a wide variety of frequency bands may be used. Moreover, the one or more access points 112 may communicate with the one or more optional controllers 116 via network 118 (such as the Internet, an intra-net and/or one or more dedicated links). According to an exemplary embodiment, the one or more optional controllers 116 may be at the same location as the other components in system 110 or may be located remotely (i.e., at a different location). Moreover, the one or more access points 112 may be managed by the one or more optional controllers 116. Furthermore, according to exemplary embodiments described herein, the one or more access points 112 may provide access to network 118 (e.g., via an Ethernet protocol), and may be a physical access point or a virtual or "software" access point that is implemented on a computer or an electronic device. According to exemplary embodiments, the system of FIG. 1 may include additional components or electronic devices, such as a router (not shown).

The one or more access points 112 and the one or more electronic devices 114 may communicate via wireless communication. In particular, one or more of access points 112 and one or more of electronic devices 114 may wirelessly communicate while: transmitting advertising frames on wireless channels, detecting one another by scanning wireless channels, exchanging subsequent data/management frames (such as association requests and responses) to establish a connection, configure security options (e.g., Internet Protocol Security), transmit and receive frames or packets via the connection (which may include the association requests and/or additional information as payloads), etc.

The one or more access points 112, the one or more electronic devices 114 and/or the one or more optional controls 116 may include subsystems, such as a networking subsystem, a memory subsystem and a processor subsystem. In addition, the one or more access points 112 and the one or more electronic devices 114 may include radios 120 in the networking subsystems. More generally, the one or more access points 112 and the one or more electronic devices 114 can include (or can be included within) any electronic devices with the networking subsystems that enable the one or more access points 112 and the one or more electronic devices 114 to wirelessly communicate with each other.

As can be seen in FIG. 1, wireless signals 122 (represented by a jagged line) are transmitted from a radio 120-1 in electronic device 114-1. These wireless signals are received by radio 120-2 in at least one of the one or more access points 112, such as access point 112-1. In particular, electronic device 114-1 may transmit frames or packets. In turn, these frames or packets may be received by access point 112-1. This may allow electronic device 114-1 to communicate information to access point 112-1. Note that the communication between electronic device 114-1 and access point 112-1 may be characterized by a variety of performance metrics, such as: a data rate, a data rate for successful communication (which is sometimes referred to as a "throughput"), an error rate (such as a retry or resend rate), a mean-square error of equalized signals relative to an equalization target, intersymbol interference, multipath interference, an SNR, a width of an eye pattern, a ratio of number of bytes successfully communicated during a time interval (such as 1-10 s) to an estimated maximum number of bytes that can be communicated in the time interval (the latter of which is sometimes referred to as the "capacity" of a communication channel or link), and/or a ratio of an actual data rate to an estimated data rate (which is sometimes referred to as "utilization"). While instances of radios 120 are shown in the one or more electronic devices 114 and the one or more access points 112, one or more of these instances may be different from the other instances of radios 120.

We now describe embodiments of an electronic device, which may perform at least some of the operations in the communication technique. For example, the electronic device may include a component in system 110, such as one of: the one or more access points 112, the one or more electronic devices 114 and/or the one or more optional controllers 116.

Figure 2:
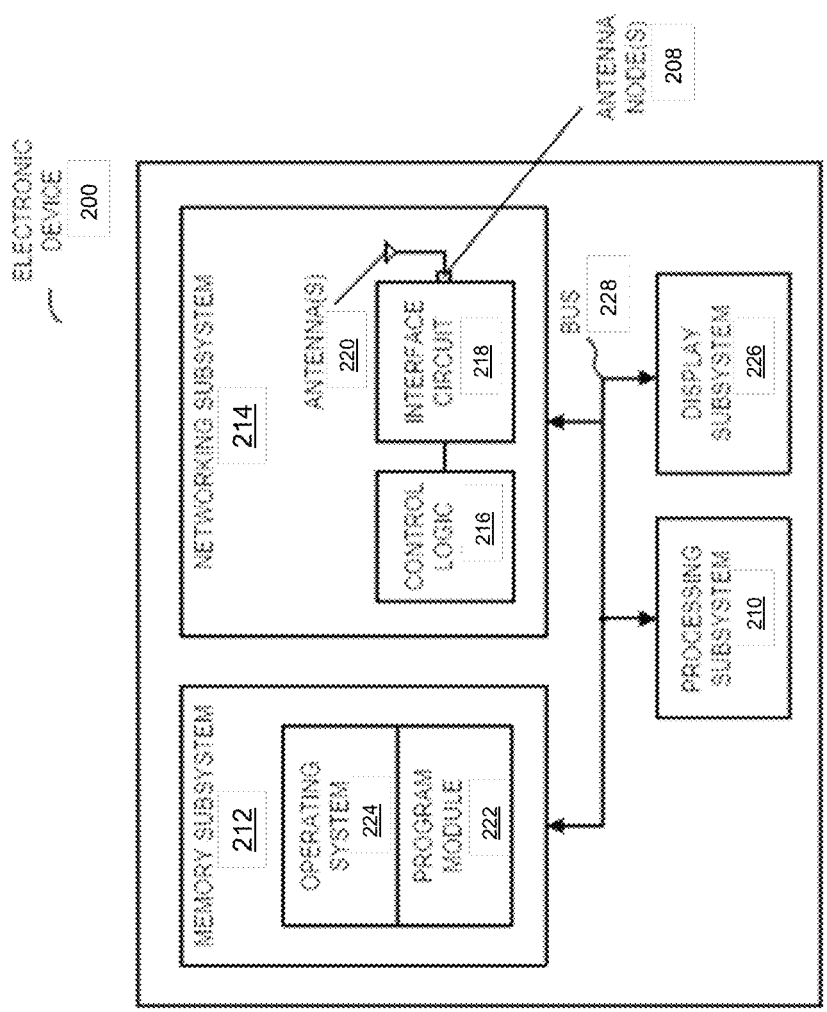
FIG. 2 presents a block diagram illustrating an electronic device in accordance with an exemplary embodiment of the present disclosure.

FIG. 2 presents a block diagram illustrating an electronic device 200 in accordance with an exemplary embodiment of the present disclosure. This electronic device 200 includes processing subsystem 210, memory subsystem 212, and networking subsystem 214. Processing subsystem 210 includes one or more devices configured to perform computational operations. For example, processing subsystem 210 can include one or more microprocessors, ASICs, microcontrollers, programmable-logic devices, graphical processor units (GPUs) and/or one or more digital signal processors (DSPs).

Memory subsystem 212 includes one or more devices for storing data and/or instructions for processing subsystem 210 and networking subsystem 214. For example, memory subsystem 212 can include dynamic random access memory (DRAM), static random access memory (SRAM), and/or other types of memory (which collectively or individually are sometimes referred to as a "computer-readable storage medium"). In some embodiments, instructions for processing subsystem 210 in memory subsystem 212 include: program instructions or sets of instructions (such as program instructions 222 or operating system 724), which may be executed by processing subsystem 210. According to an exemplary embodiment, the one or more computer programs may constitute a computer-program mechanism. Moreover, instructions in the various modules in memory subsystem 212 may be implemented in: a high-level procedural language, an object-oriented programming language, and/or in an assembly or machine language. The main memory 206 can be configured to store data values, data tables, and parameters associated with a CQ score computation such as, for example, parameter values and data obtained from the link quality measurements and those necessary to execute the algorithms for performing the CQ computation. Furthermore, the programming language may be compiled or interpreted, e.g., configurable or configured (which may be used interchangeably in this discussion), to be executed by processing subsystem 210.

In addition, memory subsystem 212 can include mechanisms for controlling access to the memory. In some embodiments, memory subsystem 212 includes a memory hierarchy that comprises one or more caches coupled to a memory in electronic device 200. In some of these embodiments, one or more of the caches is located in processing subsystem 210.

In some embodiments, memory subsystem 212 is coupled to one or more high-capacity mass-storage devices (not shown). For example, memory subsystem 212 can be coupled to a magnetic or optical drive, a solid-state drive, removable storage unit, or another type of mass-storage device. In these embodiments, memory subsystem 212 can be used by electronic device 200 as fast-access storage for often-used data, while the mass-storage device is used to store less frequently used data.

Networking subsystem 214 includes one or more devices configured to couple to and communicate on a wired and/or wireless network (i.e., to perform network operations), including: control logic 216, an interface circuit 218 and one or more antennas 220 (or antenna elements). According to another exemplary embodiment, electronic device 200 can include one or more nodes, such as nodes 208, e.g., a pad, which does not have an antenna but can be coupled to the one or more antennas 220. Thus, electronic device 700 may or may not include the one or more antennas 220.) For example, networking subsystem 214 can include a Bluetooth networking system, a cellular networking system (e.g., a 3G/4G/5G network such as UMTS, LTE, etc.), a USB networking system, a networking system based on the standards described in IEEE 802.11 (e.g., a Wi-Fi networking system), an Ethernet networking system, and/or another networking system.

According to another exemplary embodiment, a transmit antenna radiation pattern of electronic device 200 may be adapted or changed using pattern shapers (such as reflectors) in one or more antennas 220 (or antenna elements), which can be independently and selectively electrically coupled to ground to steer the transmit antenna radiation pattern in different directions. Thus, if one or more antennas 220 includes N antenna-radiation-pattern shapers, the one or more antennas 220 may have 2N different antenna-radiation-pattern configurations. More generally, a given antenna radiation pattern may include amplitudes and/or phases of signals that specify a direction of the main or primary lobe of the given antenna radiation pattern, as well as so-called "exclusion regions" or "exclusion zones" (which are sometimes referred to as "notches" or "nulls"). Note that an exclusion zone of the given antenna radiation pattern includes a low-intensity region of the given antenna radiation pattern. While the intensity is not necessarily zero in the exclusion zone, it may be below a threshold, such as 3 dB or lower than the peak gain of the given antenna radiation pattern. Thus, the given antenna radiation pattern may include a local maximum (e.g., a primary beam) that directs gain in the direction of an electronic device that is of interest, and one or more local minima that reduce gain in the direction of other electronic devices that are not of interest. In this way, the given antenna radiation pattern may be selected so that communication that is undesirable (such as with the other electronic devices) is avoided to reduce or eliminate adverse effects, such as interference or crosstalk.

Networking subsystem 214 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a "network interface" for the network system. Moreover, in some embodiments a "network" or a "connection" between the electronic devices does not yet exist. Therefore, electronic device 200 may use the mechanisms in networking subsystem 214 for performing simple wireless communication between the electronic devices, e.g., transmitting frames and/or scanning for frames transmitted by other electronic devices.

Within electronic device 200, processing subsystem 210, memory subsystem 212, and networking subsystem 214 are coupled together using bus 228. Bus 228 may include an electrical, optical, and/or electro-optical connection that the subsystems can use to communicate commands and data among one another. Although only one bus 228 is shown for clarity, different embodiments can include a different number or configuration of electrical, optical, and/or electro-optical connections among the subsystems.

In some embodiments, electronic device 200 includes a display subsystem 226 for displaying information on a display, which may include a display driver and the display, such as a liquid-crystal display, a multi-touch touchscreen, etc.

Electronic device 200 can be (or can be included in) any electronic device with at least one network interface. For example, electronic device 200 can be (or can be included in): a desktop computer, a laptop computer, a subnotebook/netbook, a server, a computer, a mainframe computer, a cloud-based computer, a tablet computer, a smartphone, a cellular telephone, a smartwatch, a consumer-electronic device, a portable computing device, an access point, a transceiver, a controller, a radio node, a router, a switch, communication equipment, a wireless dongle, an access point, test equipment, and/or another electronic device.

Although specific components are used to describe electronic device 200, in alternative embodiments, different components and/or subsystems may be present in electronic device 200. For example, electronic device 200 may include one or more additional processing subsystems, memory subsystems, networking subsystems, and/or display subsystems. Additionally, one or more of the subsystems may not be present in electronic device 700. Moreover, in some embodiments, electronic device 200 may include one or more additional subsystems that are not shown in FIG. 2. Also, although separate subsystems are shown in FIG. 2, in some embodiments some or all of a given subsystem or component can be integrated into one or more of the other subsystems or component(s) in electronic device 200. For example, in some embodiments program instructions 222 are included in operating system 224 and/or control logic 216 is included in interface circuit 218.

For example, the software can include one or more modules or engines configured to perform the functions of the exemplary embodiments described herein. Each of the modules or engines may be implemented using hardware and, in some instances, may also utilize software, such as corresponding to program code and/or programming instructions stored in secondary memory 208. Such instructions can, for example, comprise interpreted instructions, such as script instructions, e.g., JavaScript or ECMAScript instructions, or executable code, or other instructions stored in a computer readable medium. In such instances, program code may be interpreted or compiled by the respective processors (e.g., by a compiling module or engine) prior to execution. For example, the program code may be source code written in a programming language that is translated into a lower level language, such as assembly language or machine code, for execution by the one or more processors and/or any additional hardware components. The process of compiling may include the use of lexical analysis, preprocessing, parsing, semantic analysis, syntax-directed translation, code generation, code optimization, and any other techniques that may be suitable for translation of program code into a lower level language suitable for controlling the electronic device 200 to perform the functions disclosed herein. It will be apparent to persons having skill in the relevant art that such processes result in the electronic device 200 being a specially configured computing device uniquely programmed to perform the functions described above.

Moreover, the circuits and components in electronic device 200 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a "communication circuit" or a "means for communication") may implement some or all of the functionality of networking subsystem 214. The integrated circuit may include hardware and/or software mechanisms that are used for transmitting wireless signals from electronic device 200 and receiving signals at electronic device 200 from other electronic devices. Aside from the mechanisms herein described, radios are generally known in the art and hence are not described in detail. In general, networking subsystem 214 and/or the integrated circuit can include any number of radios. Note that the radios in multiple-radio embodiments function in a similar way to the described single-radio embodiments.

In some embodiments, networking subsystem 214 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that "monitoring" as used herein comprises receiving signals from other electronic devices and possibly performing one or more processing operations on the received signals).

According to an exemplary embodiment of the present disclosure, the electronic device 200 can be configured to receive, via the networking subsystem 214, link quality measurements associated with a mobile computing device located at one or more data points in the wireless network during a sampling interval. The networking subsystem 214 can include a combination of hardware and software components for connecting to the one or more client devices STAn, which according to an exemplary embodiment is implemented via a wireless link. For example, the networking subsystem 214 can include the control logic 216 and the interface circuit 218, which can establish a wireless adapter such as a network interface controller, having an antenna and configured with software modules for communicating with other devices via a wireless interface, such as but not limited to an IEEE 802.11 standard. During a receive operation, the communications interface networking subsystem 214 can be configured to identify parts of a received data signal (e.g., header and payload) and parse the data signal and/or data packet into small frames (e.g., bytes, words) or segments for further processing in the processing device 202. During a transmit operation, the communications interface 200 can be configured to format the data for wireless transmission to a remote device.

Coverage in Network Environments

Figure 3:
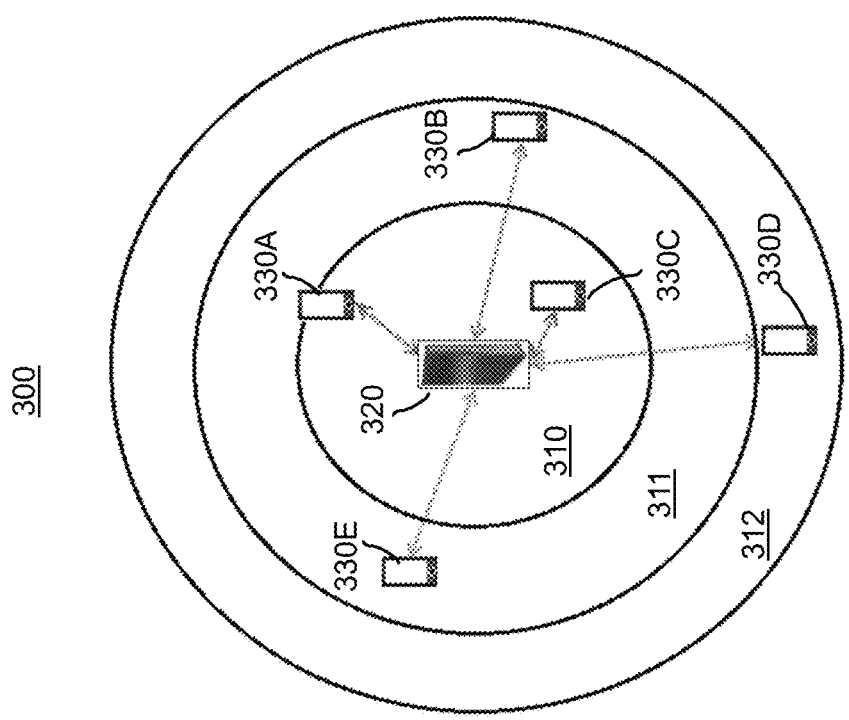
FIG. 3 is a diagram that depicts an example of a wireless network environment in accordance with an exemplary embodiment of the present disclosure.

FIG. 3 is a diagram that depicts an example of a wireless network environment 300 in accordance with an exemplary embodiment. The wireless network environment 300 including a representation of coverage with a single AP. As shown in FIG. 3, the various clients 330A, 330B, 330C, 330D, 330E (collectively, client devices 330) are shown at various distances from a wireless access point (AP) 320, such as a gateway or router. Each client has a connection, represented as a double-headed arrow with dotted lines, back to the only AP 320 that is available. Each of the coverage bands 310, 311, 312 represents physical locations within a particular range of radial distances from the AP 320, as depicted. Each of the coverage bands 310, 311, 312 is characterized by a level of link strength; that is, the quality of wireless coverage is characterized, respectively, by strong links for clients within band 310, medium links within band 311, and weak links within band 312.

In an embodiment, total coverage may be viewed as an aggregation of the multiple links that represent the connections from the AP 320 to the Wi-Fi clients 330 in the network environment 300 (e.g., a home or other residential environment, which may be associated with a subscriber to the services of a MSO).

In some embodiments, any one or more of the depicted client devices 330 may represent the same client (e.g., a mobile device) in different locations at different times. In these embodiments, the coverage may be viewed as a measure of the cumulative experience of multiple clients across multiple locations. According to other exemplary embodiments in the context of the present disclosure, each of the depicted clients 330A to 330E represents a different client device.

Figure 4:
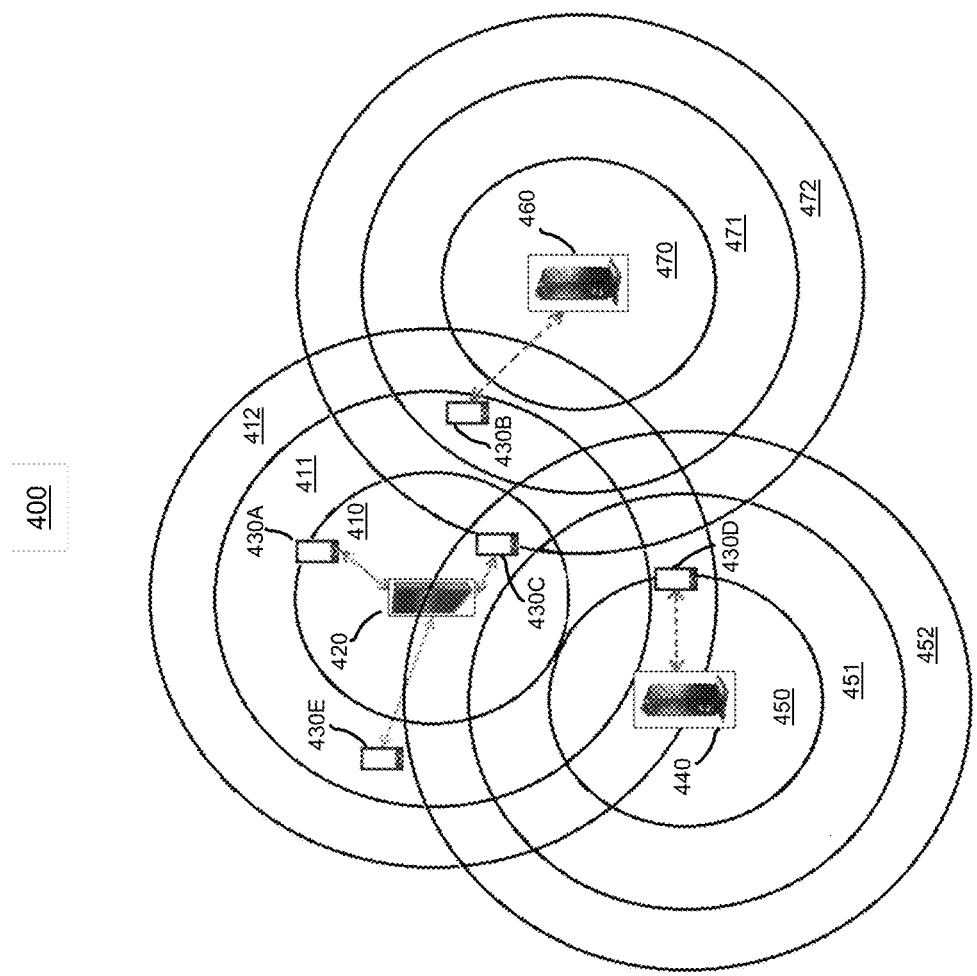
FIG. 4 is a diagram that depicts an example of a multiple access point wireless network environment in accordance with an exemplary embodiment of the present disclosure.

FIG. 4 is a diagram that depicts an example of a multiple access point wireless network environment 400 in accordance with an exemplary embodiment. The network environment 400 includes an AP and extenders. In the diagram of FIG. 4, the presence of additional extenders, together with the concept of AP steering, allows for more links to become stronger.

As shown in FIG. 4, the various clients 430A, 430B, 430C, 430D, 430E (collectively, client devices 430) are again shown at various distances from a wireless access point (AP) 420, such as a gateway or router. The client devices 430 are also shown at various distances from extender 440 and from extender 460. As depicted, it is apparent that AP 420 and extenders 440, 460 have overlapping coverage.

Each of the coverage bands 410, 411, 412 represents physical locations within a particular range of radial distances from the AP 420, as depicted. Each of the coverage bands 410, 411, 412 is characterized by a level of link strength; that is, the quality of wireless coverage specifically from AP 420 is characterized, respectively, by strong links for clients connected to AP 420 within band 410, medium links for clients connected to AP 420 within band 411, and weak links for clients connected to AP 420 within band 412.

Each of the coverage bands 450, 451, 452 represents physical locations within a particular range of radial distances from extender 440, as depicted. Each of the coverage bands 450, 451, 452 is characterized by a level of link strength; that is, the quality of wireless coverage is characterized, respectively, by strong links for clients connected to extender 440 within band 450, medium links for clients connected to extender 440 within band 451, and weak links for clients connected to extender 440 within band 452.

Each of the coverage bands 470, 471, 472 represents physical locations within a particular range of radial distances from extender 460, as depicted. Each of the coverage bands 470, 471, 472 is characterized by a level of link strength; that is, the quality of wireless coverage is characterized, respectively, by strong links for clients connected to extender 460 within band 470, medium links for clients connected to extender 460 within band 471, and weak links for clients connected to extender 460 within band 472.

Each client has a connection, represented as a double-headed arrow with dotted lines, which is not necessarily a connection back to AP 420, because extenders 440, 460 are also available to extend coverage, and in some cases to provide stronger links (or, for example, less congestion) for clients at a particular location than the AP 420 can provide. As depicted, client 430B is connected with extender 460 to receive improved coverage quality, and client 430D is connected with extender 440 to receive improved coverage quality.

Coverage Quotient (CQ) Score

Exemplary embodiments of the present disclosure provide a score that is representative of the experience of Wi-Fi STAs within a specific network. This solution is referred to as the Coverage Quotient (CQ) score. The CQ Score is an adaptive measurement that considers the dynamic behavior of Wi-Fi clients and assesses collective performance across all Access Points for both the clients themselves as well as the network collectively. The characteristics of the CQ Scoring methodologies are as follows:

1. CQ-Score methodology assesses the various devices that connect to the network APs on a regular basis.

2. CQ-Score methodology learns about the mobility of a device by assessing the dynamic nature of its position, reflected by the collection of downstream MCS transmission rates. This is done by building a 'dynamic range map', predictive of the location profile for the network. The method grooms the data by predicting 'transient extremes' which can be seen when a mobile device is going out of range and subsequently losing association. For instance, someone leaving the home with their mobile device (e.g., smartphone) will continue to have access for some distance until such a time when the Wi-Fi signal is too weak to be recognized. This data point must be ignored, since it is a transient that should not affect the overall measurement.

3. CQ-Score methodology applies the concept of a 'data-usage mask' to add weight to the 'dynamic range map' produced above. This improvement allows a data point from a particular device at a particular low MCS rate location associated with low/no data usage (a user is mowing the lawn with his device in his pocket), to be set lower if not ignored entirely. Whereas if the user is streaming media or video content to a video device on the patio at a relatively low MCS rate location, this measurement is given more weight.

4. CQ-Score methodology learns about the temporal behavior of devices, in terms of a 24-hour period, to detect patterns associated with specific times of the day. Two sets of such data are relevant, one for weekdays and another for weekends. This data may be retained in a cloud-based service to attain a longer time view.

CQ Score Range Definition

According to an exemplary embodiment, the CQ Score can be defined by a range of values from 0 to 9. It should be understood, however, that any bounded range of values can be used as desired. The defined range should be granular enough to give adequate definition of the coverage, yet not be onerous to decipher. The higher the score the better the coverage from a Wi-Fi signaling perspective. It should be understood that the range of values 0-9 is not chosen randomly but corresponds to MCS rates as defined in IEEE 802.11-2016 and expanded for legacy rates. According to exemplary embodiments, the range is adjustable in that rounding may be employed, or a more accurate representation may be obtained by utilizing less stringent rounding for calculations.

According to an exemplary embodiment, the CQ-Score can be represented by a value range of 1 to 10, for example.

Based on the exemplary range, each number value serves as a figure of merit. For example, the higher the score, the better the coverage, e.g., simply from a Wi-Fi signaling perspective. In further embodiments, an adjective may be provided to describe the measure. According to yet other embodiments, the range of the score could be set to any finite, bounded, or smaller range, such as 1 to 5, etc., for example.

An adaptive and isometric Wi-Fi link quality matrix can be provided. This quality matrix serves as a proxy of the location of the device with respect to the 'associated' AP, given that the client device may be steered to a better AP (e.g., by HomeAssure®, or by a network controller).

Figure 5:
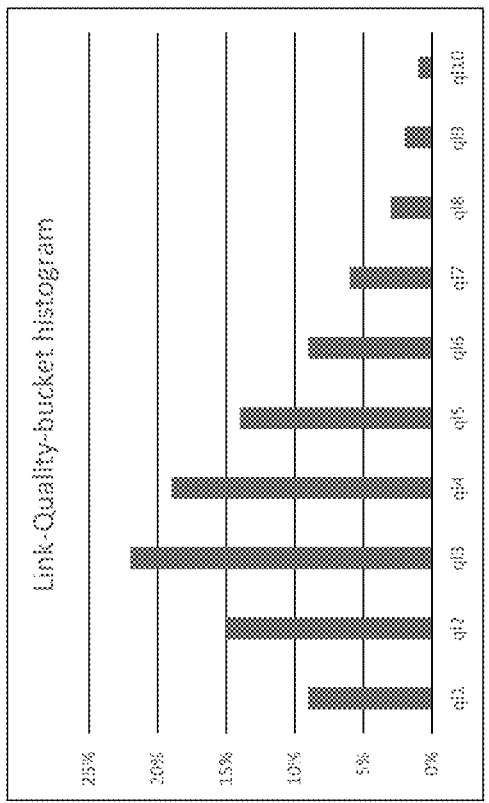
FIG. 5 depicts an example of a histogram of data for a link-quality-bucket, in accordance with an exemplary embodiment of the present disclosure.

FIG. 5 depicts an example of a histogram of data for a link-quality-bucket, in accordance with an exemplary embodiment of the present disclosure. After a number of measurements (e.g., 100), a typical histogram for a Wi-Fi client that moves around could look like the histogram depicted in FIG. 5. In interpreting the graph of FIG. 5, note that the sum of the observations adds up to 100, by design.

To obtain the measurement data shown in FIG. 5, a single data point of the quality matrix would be the measurement of Wi-Fi link quality between a given Wi-Fi client and the AP with which it is associated, using a combination of metrics, dominated by the MCS value settled on, since it takes into account the SNR value in addition to the physical link details. This process is repeated for the given client repeatedly (configurable frequency). The link quality metric is provided in a quantized form, and if the metric is not already quantized, the defined or selected value range or interval is used to arrive at such quantization. As such, each reading increments the "count" value for the link quality metric (or range interval). Measurements are taken on a continual basis, thereby giving more weight, inherently, to the locations (link-quality-metric as a proxy) that the Wi-Fi client is likely to be.

The term "isometric" reflects that the Wi-Fi client at multiple physical locations may exhibit the same link-quality characteristics, independent of exactly where the device is with respect to the associated AP. Even in the case of a single AP, multiple locations in a home setting could be "equivalent" independent of the physical distance, due to the presence of obstacles or reflective objects. In other words, a device is said to be in the same link-quality-metric bucket, for say, two different observations, even though in terms of physical location, they would be distinctly different locations.

As shown in FIG. 5, the x-axis includes values ql1 through ql10, which represent a link quality associated with a first link (link 1) through a link quality associated with a tenth link (link 10), which are the buckets—as depicted in the example, ten buckets—of link-quality-metric. The y-axis includes values, which represent a percentage of polling that resulted in the link-quality-metric measurement with the x-value. According to exemplary embodiments, FIG. 5 illustrates the process in which data is groomed and normalized by continuously slotting the accumulated data into the appropriate buckets (ql1 to 1110) regularly, where the frequency with which the data is slotted is determined based on a movement vector of the various mobile devices. According to an exemplary embodiment, the data can be normalized to a % value of the total number of observations.

From the exemplary measurements of FIG. 5, the mobile device, when polled, has demonstrated a link quality metric of value "ql3" 22% of the time.

According to the exemplary embodiments described herein, the above data can be groomed, for considering situations that can affect the accuracy based on the intent. For example:
  A mobile device (e.g., smartphone) could be in a specific location (or region), but then is hardly used at all. For instance, someone is mowing the lawn, and has the smartphone handy to be able to receive calls, but then is not really doing any active work.
  A mobile device is on its way out of the coverage area of the wireless network as in the user is moving away or out of the coverage area, causing a set of measurements that continue to decrease in link-quality-metric, until it completely dissociates from any AP.

According to exemplary embodiments of the present disclosure, the concept of "data usage" is used to determine whether to take (accept) or ignore a data-point. The exemplary embodiments use polling as described above while measuring the link-quality-metric, and checking to determine if there has been data traffic with the client (of significant nature, not just control traffic). For example, according to an exemplary implementation the poll for the link-quality-metric (and not increment the associated bucket) can be ignored if no data is seen, and increment the bucket if data usage was seen. In another exemplary implementation, a configurable flag may be provided as an indication of whether to use the data-usage case as a binary gate, or as a softer weight.

The technique of continuous measurement ensures that ephemeral locations (as in the second example above) are dwarfed by the other data collected.

According to exemplary embodiments of the present disclosure, the average link-quality-metric—representing an example of a CQ-Score or coverage quality score—for a single mobile device or client can be calculated as follows:

$$cQ[m] = \frac{1}{n}\sum_{i=1}^{n} ql_i * \% \text{ occurrence}(ql_i) \qquad (1)$$

where % occurrence is the y-axis value.

FIG. 5 describes an exemplary implementation in the context of one client device, however, it should be understood that that the steps and operations performed for one client can be expanded to encompass implementation across plural or all the clients that show up with regularity; e.g., ignoring clients that show up rarely.

Figure 6:
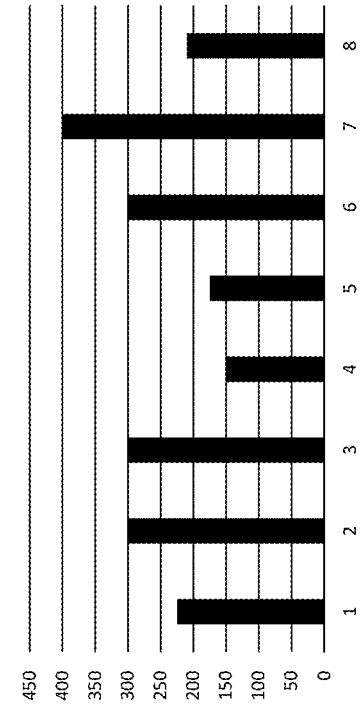
FIG. 6 depicts an example of a histogram of data showing coverage quality for a number of devices, in accordance with an exemplary embodiment of the present disclosure.

FIG. 6 depicts an example of a histogram of data showing coverage quality for a multiple devices, in accordance with an exemplary embodiment of the present disclosure. To arrive at the histogram of FIG. 6, the steps performed with respect to the single client of FIG. 5, are duplicated across multiple devices according to a CQ[m] for m devices:

$$cQ_{avg} = \frac{1}{m}\sum_{i=1}^{m} cQ[m] \qquad (2)$$

For the exemplary embodiment of FIG. 6, k is a normalizing constant that narrows the result to a range of 1 thru 9; such that:

$$\text{CQ Score} = k * CQ_{avg} \qquad (3)$$

CQ Score Data Sampling Frequency

The data sample rate for the CQ Score solution should be configurable and adaptable. However, the sampling frequency should not over-burden the system nor should it diminish resolution in the scoring algorithm. According to an exemplary embodiment of the present disclosure, a sampling frequency of once every second should suffice. The value of this sampling frequency is based on the fact that average walking speed is 1.4 m/sec. This will average an open-air path loss (or gain) in the sampling interval of approximately 1.4 dB. Moving to less frequent sampling could allow for a higher than desired change in signal strength. For example, at 2 seconds the loss or gain would be 3.9 dB, which is a drastic change in power.

According to an exemplary embodiment, the open-air path loss may be calculated utilizing the formula:

$$\text{Path Loss} = 32.45 + (20 * LOG_{10}(FREQ_{MHZ})) + (20 * LOG_{10}(DISTANCE_{KM})) \qquad (4)$$

There is no way to determine until the next sampling interval whether actions, such as walking through a doorway, introduce additional parameters or variables that increase attenuation due to intervening walls, floors, or other structures. However, even with this consideration one sample per second has been determined to be a suitable value for an optimal sampling rate in testing for an active network.

According to exemplary embodiments of the present disclosure, the sampling rate is dynamically adjustable to account for situations when a network is lightly loaded. For example, under circumstances of low data usage the sampling rate may be decreased. In this manner, the system can be optimized to unburden the system for accumulating sampled data which during periods which statistically remains stable for the network. For example, during an average day when everyone is at work or school, little or no data is being used in the network.

CQ Score Sampling—MCS or Data Rate

According to exemplary embodiments of the present disclosure, one of the metrics sampled in order to derive the CQ Score is the downstream MCS rate of Data Frames from the AP to the connected device. This metric was selected specifically because it is a relative measure of:

1. The Signal to Noise Ratio at the receiving device of the transmitted signal.
2. It is a true indication of the received signal quality at the device. It accounts for the signal strength, noise floor, and PER of transmissions from an AP to the client device.
3. It is easily obtainable on the AP, and thus does not rely on client capabilities for reporting.
4. It is independent of the number of Spatial Streams being supported by any given client device.
5. APs have rate shifting algorithms which try to maximize the MCS rate at any given point in time.
6. APs have rate shifting algorithms which will adapt to channel conditions for mobile devices corresponding to greater range, or inhibited channel conditions.
7. An inferred MCS value can be assigned to legacy devices which relieves the stress of understanding client capabilities and translates directly into the scoring method.
8. It produces no additional overhead in the Wi-Fi subsystem for request/report pairs over the air.

Non-MIMO Rates to MCS Translations

Since most of the legacy rates (802.11a, 802.11b, 802.11g) may not report actual modulation types or coding schemes, exemplary embodiments of the present disclosure establish an inference from the data transmission rate to an associated client device per the following tables. The exemplary values in Tables 1 and 2 were selected based on the relative 'goodness' of the signal received at the associated client devices.

The tables that follow indicate exemplary examples of MCS Values for various Protocols, and the values which should be reported as part of the CQ Scoring method.

TABLE 1

802.11b Tx Rate to MCS Values

| 802.11b Rate (Mbps) | Modulation Type | Data Bits Per Symbol | MCS Value |
|---|---|---|---|
| 1 | DBPSK | 1 | 1 |
| 2 | DQPSK | 2 | 3 |
| 5.5 | CCK | 4 | 5 |
| 11 | CCK | 8 | 7 |

TABLE 2

802.11 a/g Tx Rate to MCS Values

| 802.11 a/g Rate (Mbps) | Modulation Type | Coding Rate | MCS Value |
|---|---|---|---|
| 6 | BPSK | 1/2 | 0 |
| 9 | BPSK | 3/4 | 1 |
| 12 | QPSK | 1/2 | 2 |
| 18 | QPSK | 3/4 | 3 |
| 24 | 16-QAM | 1/2 | 4 |
| 36 | 16-QAM | 3/4 | 5 |
| 48 | 64-QAM | 1/2 | 6 |
| 54 | 64-QAM | 3/4 | 7 |

MIMO Rates to MCS Translations

Table 3 relates to an exemplary embodiment which associates MIMO Modulation Type to MCS Reported Values. The CQ Scoring methods described herein ignores the Spatial Stream component (SS) of a data signal focusing instead on the transmitted modulation type and coding rate for its scoring method. As a result, the scoring methodology ignores APs which may utilize STBC methods to replicate a signal across multiple antennas for Tx Diversity gain, or those which may transmit on narrower channels, in order to gain more spectral power. However, the score is valid for measuring coverage, even if the transmission methods are not the most efficient. A key consideration in CQ scoring is in determining the coverage for the device based on the combination of the modulation type and coding rate.

TABLE 3

MIMO MCS Values

| HT MCS | VHT MCS | HE MCS | Modulation Type | Coding Rate | Reported MCS |
|---|---|---|---|---|---|
| 0, 8, 16, 24 | 0 | 0 | BPSK | 1/2 | 0 |
| 1, 9, 17, 25 | 1 | 1 | QPSK | 1/2 | 1 |
| 2, 10, 18, 26 | 2 | 2 | QPSK | 3/4 | 2 |
| 3, 11, 19, 27 | 3 | 3 | 16-QAM | 1/2 | 3 |
| 4, 12, 20, 28 | 4 | 4 | 16-QAM | 3/4 | 4 |
| 5, 13, 21, 29 | 5 | 5 | 64-QAM | 2/3 | 5 |
| 6, 14, 22, 30 | 6 | 6 | 64-QAM | 3/4 | 6 |
| 7, 15, 23, 31 | 7 | 7 | 64-QAM | 5/6 | 7 |
| N/A | 8 | 8 | 256-QAM | 3/4 | 8 |
| N/A | 9 | 9 | 256-QAM | 5/6 | 9 |
| N/A | N/A | 10 | 1024-QAM | 3/4 | 9* |
| N/A | N/A | 11 | 1024-QAM | 5/6 | 9* |

According to an exemplary embodiment, for HE, the reported MCS value is at the maximum of scoring range since the actual range supported for 1024 QAM is so short. It should be understood that the reported MCS value can correspond to any suitable level in the range as desired.

CQ Score Sample—Amount of Data Transmitted

According to exemplary embodiments of the present disclosure, the second part of obtaining the CQ Score for a connected device or network is determining a weighting value for the score based on the amount of data transmitted to the device during the scoring interval. The weight accounts for the individual device data usage on the network and gives the scoring algorithm the ability to 1) Assess overall network usage, and 2) more heavily weight client devices which are more active during a given sample interval.

The sample is a simple byte count of the number of data bytes transferred to the connected device during the sample interval. This value along with the sampled or computed MCS value allows for a valid sample to be inserted into the calculations described in subsequent sections.

CQ Score Sample Weighting

According to exemplary embodiments of the present disclosure, the CQ Score value is weighted based on the amount of data being passed to a particular client (e.g., mobile device). This process gives "weight" to the coverage of each individual client within the realm of the entire network. The weight can be bounded with upper and lower limits. According to an exemplary embodiment, the upper and lower limits of the weight can be configurable within the sampling system.

The weighted CQ Score for an individual sample for a device can be determined according to the following:

```
Bits = (ByteCount * 8) / SampleInterval   // Gives a bits per second
                                          // for the sample period
If Bits > SampleUpperLimit then Bits = SampleUpperLimit
If Bits <= SampleLowerLimit then Bits = 0
SampleScore = Bits / ThroughputWeightScaler
```

If the amount of data transmitted to a client is less than the lower limit, then no sample is recorded. This takes into account
- Disassociated clients
- Clients which are statistically not utilizing data on the system even if still associated. This could be 100 bytes-per-second or a value as deemed statistically valid.
- This value should be non-zero.
- The lower limit should account for voice traffic which is low bandwidth, but high priority.

If the Amount of Data transmitted to a mobile device is greater than the upper limit, then the data is capped at the upper limit. This insures that mobile devices which are utilizing huge amounts of data don't deplete system resources in the scoring algorithm (i.e. don't blow size constraints for the variables). Mobile devices utilizing huge amounts of bandwidth (>100 Mbps for example) are capped at 100 Mbps.

According to an exemplary embodiment, a configurable ThroughputWeightScaler, which is a simple divisor, can be used to scale a sample to a reasonable level for storage and later averaging. An exemplary value for this scalar is 1000, which as an example shifts the amount of samples stored from Mbps to Kbps.

Pseudo code for calculating the weighted CQ Score for an individual sample for a device is shown below:

Some illustrative examples for three connected devices are given in Table 4 below.

TABLE 4

| Sample Data Weighting | | | |
|---|---|---|---|
| STA | Reported Bytes | Mbps | Sample Score |
| 1 | 1,250,000 | 10 | 1000 |
| 2 | 625,000 | 5 | 500 |
| 3 | 25,000 | 0.2 | 20 |

According to an exemplary embodiment of the present disclosure, the weighting value can be optimized to determine the QoS markings of the data being passed to a device. This optimization allows voice traffic which is of lower bandwidth, but high priority to be weighted more heavily within the sampling subsystem. Utilizing this optimization requires the CQ System to become QoS aware, utilizing either deep packet inspection to determine DSCP or CoS frame markings or inspection of Wi-Fi WMM Packet Buffers which are associated with certain connected devices.

CQ Score Data Bins

Once a CQ score has been calculated and weighted, the next step in the process is to 'bin' the data based on the MCS rate at which the data was transmitted. The data bins relate to MCS values 0 to 9 and correspond to the CQ Sample Part 1. Placing the individual, weighted scores into the bins allows for an average CQ Score value to be determined across a "Scoring Interval". The bins are Zeroed at the beginning of the score intervals and individual scores are added as they are taken at the sample intervals.

A score table is maintained for each device which is active and connected to the network. It is outside the scope of this document to delineate determining the status of connected and active devices.

At each sample interval the score determined for each device is added to its respective bin according to:

$$StaBinTable[STA][SampleMCSRate].BinCount\mathrel{+}=SampleScore \qquad (5)$$

CQ Score Interval

According to exemplary embodiments of the present disclosure, a CQ Scoring Interval is a time interval at which the CQ Score calculations occur for both individual client devices and the overall network. The Scoring Interval is a configurable or adjustable value, and can be set to 60 seconds, or once a minute, or any other suitable value as desired. During each Scoring interval calculations are made to compute a CQ score for individual client devices as well as for the overall network.

According to an exemplary embodiment, a CQ Score Interval can also be implemented in a mesh network, where Mesh devices may be determined tracked via a Network Topology Table. The connected Mesh devices are also STA devices to their root nodes.

At the Score Interval, summations are made on a per STA basis, and final Score Value derived based on the data which is stored in the individual score bins.

STA CQ Score Calculation: The actual CQ Score is calculated per the following Sequence of calculations:

1) Total the complete score of all MCS Bins for the scoring interval as follows:

$$STAbTotal = \sum_{b=0}^{9} STABinTable[STA][b].BinCount \qquad (6)$$

2) Calculate Per Bin Percentage Values for the interval according to the following:

```
For (m = 0; m <= 9; m++)
{
   Scorebin.{m} = STABinTable[STA][m].BinCount / STAbTotal * CQScoreScaler.
}
``` where:
m=the MCS value (0-9)
CQScoreScaler=A value utilized to scale calculated CQ Scores to within a range of values. This should be a factor of 10. The larger this value, the larger will be the range of the score. Default value is set to 10, and thus the values will be limited to 0-10.

STAbTotal is the sum of all bin counts as calculated above.

This calculation gives a scaled value of the percentage of bits passed at individual MCS rates verses the total bits passed during the interval. The CQScoreScaler allows for the scores to be limited in value (0-10 is the default).

3) Calculate the Final CQ Score according to:

$$STACQScore = \left(\sum_{m=0}^{9} Scorebin.\{m\} * BinScaler * (m+1)\right) - BinScaler \quad (7)$$

where:
m=the MCS value (0-9)
BinScaler=CQScaler/10

The multiplier of the Bin Scaler is increased by 1 to alleviate a zero multiplier. The final subtraction removes this offset.

STA Score

Figure 7:
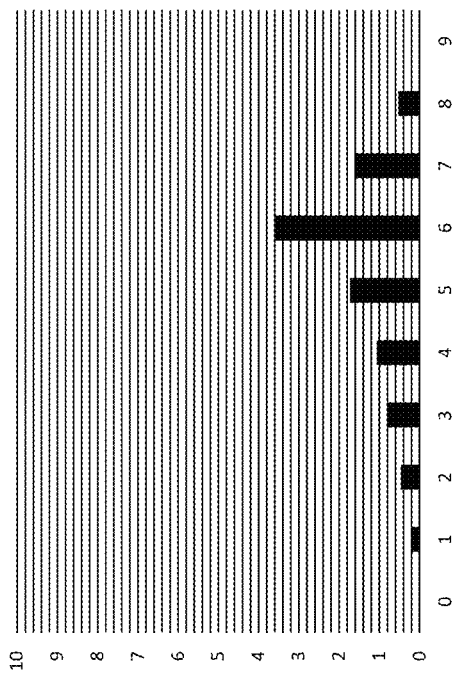
FIG. 7 depicts an example of a graph of a station's CQ Bin scores for visual display, in accordance with an embodiment of the present disclosure.

FIG. 7 depicts an example of a graph of a station's CQ Bin scores for visual display, in accordance with an embodiment of the present disclosure.

Table 5 and FIG. 7 provide an example of the output for the CQ Score calculation. According to exemplary embodiments of the present disclosure data can be displayed on a per STA Basis to track coverage for individual STA Devices.

TABLE 5

STA CQ Score Example Data
STA CQ Score = 5.35

| | Bin | | | | | | | | | |
|---|---|---|---|---|---|---|---|---|---|---|
| | 0 | 1 | 2 | 3 | 4 | 5 | 6 | 7 | 8 | 9 |
| Bin Value | 0 | 150 | 350 | 600 | 800 | 1300 | 2700 | 1200 | 400 | 0 |
| Bin Score | 0 | 0.2 | 0.47 | 0.8 | 1.07 | 1.73 | 3.6 | 1.6 | 0.53 | 0 |

Network CQ Score Calculation

As already discussed, the CQ Score for the entire network can be obtained from the individual STA CQ Scores, or by following the same series of calculations shown above by summing the individual score bins from all STAs. The data can then either be archived in a timestamped database or passed to a cloud-based system for subsequent processing.

Figure 8:
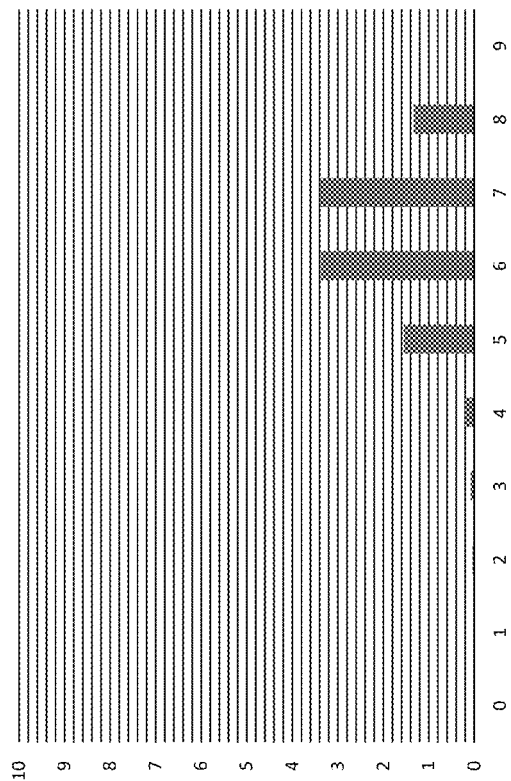
FIG. 8 depicts an example of a histogram of network CQ Score data, in accordance with an embodiment.

A set of three STAs is described in Table 6 below for use in an embodiment as an illustrative example. FIG. 8 illustrates an example of a histogram of network CQ Score data for the example of Table 6, in accordance with an exemplary embodiment.

In the foregoing example, it is demonstrated that STA1 has much more weight for the entire network, since it was passing much more data, however, each STA contributed to the overall network score.

Individual STA Scores and bTotals are shown below in Table 7.

TABLE 7

Network STA CQ Score Example

| STA | bTotal | STA CQ Score |
|---|---|---|
| 1 | 70350 | 6.46 |
| 2 | 7500 | 5.35 |
| 3 | 613 | 6.7 |

Advanced Analytics

According to another exemplary embodiment, advanced analysis of the data can be performed by archiving CQ Score Interval Data and performing subsequent analysis of the timestamped data. This can give hourly scores, daily scores and even allow for flagging low STA CQ scores across timed intervals.

Analytics can be implemented comparing a low CQ score to a bTotal to determine if a STA is demanding large amounts of data at a relatively low MCS rate on a consistent basis. The results of this analysis could lead to a service provider 'advising' a customer that one or more range extenders may be necessary in either their home or business network. The same analytic may be used to 'advise' a customer that a Wi-Fi Extender has been placed at a bad location from its root device.

Further analytics may be implemented which show the effectiveness of steering mechanisms for STA devices.

Figure 9:
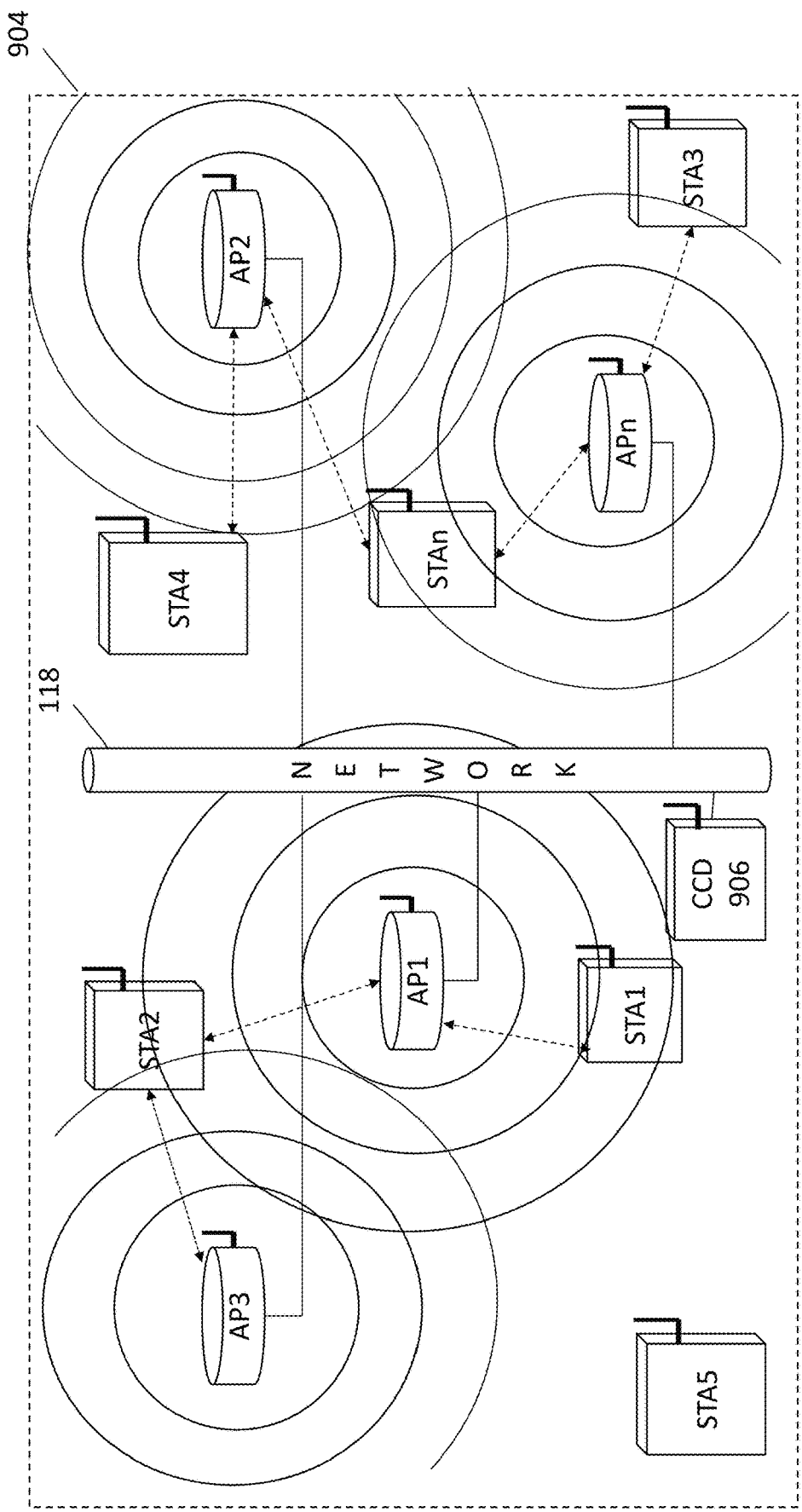
FIG. 9 illustrates a system for determining quality of coverage in a wireless local area network according to an exemplary embodiment of the present disclosure.

FIG. 9 illustrates a system for determining quality of coverage in a wireless local area network according to an exemplary embodiment of the present disclosure.

As shown in FIG. 9, the system 900 includes a local area network (LAN) 118, which is implemented in a limited area such as a home, office, school, business, yard, field or any other suitable bounded area as desired. The LAN 118 can be configured to use wireless technology, such as Wi-Fi, for connecting two or more devices for communication within a coverage area 904. The LAN 118 can include one or more access points (APn) and one or more mobile client devices (STAn). Each access point (APn) (e.g., hotspot) can be configured to allow the one or more client devices (STAn) to connect to the LAN. In embodiments, the access points APn and client devices STAn may operate using an implementation of IEEE 802.11 standards. The one or more client devices (STAn) can be configured as a mobile computing device having unrestricted movement within the coverage

TABLE 6

Network CQ Score Example

| | Bin 0 | Bin 1 | Bin 2 | Bin 3 | Bin 4 | Bin 4 | Bin 6 | Bin 7 | Bin 8 | Bin 9 |
|---|---|---|---|---|---|---|---|---|---|---|
| STA1 | 0.00 | 0.00 | 0.00 | 0.00 | 800.00 | 10,900.00 | 23,530.00 | 25,040.00 | 10,060.00 | 20.00 |
| STA2 | 0.00 | 150.00 | 350.00 | 600.00 | 800.00 | 1,300.00 | 2,700.00 | 1,200.00 | 400.00 | 0.00 |
| STA3 | 0.08 | 0.08 | 0.00 | 0.00 | 0.00 | 0.00 | 200.32 | 404.64 | 5.32 | 3.00 |
| | | | | | | | | | | |
| Total | 0.08 | 150.08 | 350.00 | 600.00 | 1,600.00 | 12,200.00 | 26,430.32 | 26,644.64 | 10,465.32 | 23.00 |
| Network Score | 0 | 0.02 | 0.04 | 0.08 | 0.2 | 1.55 | 3.37 | 3.4 | 1.33 | 0 |

Network CQ Score = 6.35 area 704. The one or more client devices (STAn) can include for example a smartphone, tablet computer, laptop computer, handheld gaming device, or any other suitable computing device. The one or more client devices (STAn) can be configured to include one or more circuits or components (e.g., a wireless adapter) for connecting to an access point APn via a wireless link (e.g., Wi-Fi). As each client device STAn moves within the coverage area 104 the wireless adapter can be configured to terminate or establish wireless links with any of the access points APn based on the quality of the signal. Each access point can be configured to communicate with other access points (APn) connected to the network for exchanging information.

When a client device enters the coverage area 904 for the LAN 118, it can broadcast a probe request over one or more channels associated with LAN 118. The probe request can include an identifier (Basic Service Set (BSS)), which refers to the MAC address of a specified access point APn on the LAN 118, but more commonly a probe request includes a broadcast address. According to an exemplary embodiment, two or more of the access points (AP-x, APn where x≠n) can be linked together to form a distribution system (Extended Service Set (ESS). Each access point APn can be configured to broadcast a beacon signal at regular intervals. The beacon signal provides information on the BSS and/or ESS identifier (ID) and device characteristics or configuration.

When an Access Point (APn) receives a probe request, it checks the ESSID, if available in the probe request. If the ESSID matches the access point or if it is a broadcast probe request, a probe response containing synchronization data and information is sent addressed to the requesting client device STAn. The probe response can also include a measure of traffic volume that the one or more Access Points (APn) can support depending on the BSS or ESS configuration. Upon receiving the response, the client device (STAn) checks the quality of the signal received. A client device within range of multiple access points can select the wireless link having the best performance, which can include a combination of highest data capacity and lowest traffic load.

In embodiments compliant with IEEE 802.11 wireless LAN standards, the access points and client devices are configured to transfer data over a wireless link using a standardized collection of modulation and coding parameters referred to as a modulation coding scheme (MCS). Table 1 is an abbreviated listing of exemplary MCS indexes used in accordance with embodiments of the present disclosure. It should be understood by one of ordinary skill in the relevant art that number of known modulation coding schemes exceeds the eleven (11) schemes shown in Table 1. According to an exemplary embodiment of the present disclosure, the total number of MCS indexes can be scaled or quantized so that each MCS index can be assigned to one of plural bins for evaluating the link quality metrics. For example, the scaling can involve more than one MCS coding index being assigned to a link quality bin as described in association with exemplary embodiments of the present disclosure.

TABLE 3

MCS Index to Modulation Coding Rate

| MCS | Modulation Type | Coding Rate |
|---|---|---|
| 0 | BPSK | 1/2 |
| 1 | QPSK | 1/2 |

TABLE 3-continued

MCS Index to Modulation Coding Rate

| MCS | Modulation Type | Coding Rate |
|---|---|---|
| 2 | QPSK | 3/4 |
| 3 | 16-QAM | 1/2 |
| 4 | 16-QAM | 3/4 |
| 5 | 64-QAM | 2/3 |
| 6 | 64-QAM | 3/4 |
| 7 | 64-QAM | 5/6 |
| 8 | 256-QAM | 3/4 |
| 9 | 256-QAM | 5/6 |
| 10 | 1024-QAM | 3/4 |
| 11 | 1024-QAM | 5/6 |

As shown in Table 1, the MCS index is based on a combination of parameters including modulation (e.g., coding) type and coding rate. The modulation type specifies how data is sent over the wireless link. Each modulation type is designed to sustain data rates at a specified level and with an accepted amount of interference. The coding rate is an indication of the percentage of the data stream that is being used to transmit usable network data. For example, Binary Phase Shift Key (BPSK) allows data transmission at one bit per symbol, while Quadrature Phase Shift Key (QPSK) modulation allows data transmission at two bits per symbol. As such, QPSK can be used to double the data rate and still use the same bandwidth or to halve the bandwidth for the same data rate. Quadrature amplitude modulation (QAM) is a digital modulation scheme that moderates two sinusoidal carriers that are 90° out-of-phase with each other and summed to result in a signal with amplitude and phase modulation. The MCS allows for modulation types of QAM to be applied in 16-bit, 64-bit, 256-bit, or 1024-bit digital formats.

Additional parameters used to determine the MCS index can include channel size, number of spatial streams, and guard interval, among others. Each access point selects a suitable MCS index with which to communicate with a STA based on channel conditions as discerned from feedback from that STA. The MCS index is negotiated during communication and serves to strike a balance between maximum possible data rate and maximum acceptable error rate.

The effectiveness of the coverage area of a wireless LAN can be determined by the transmission distance of the Access Points (APn) to the client devices (STAn). The LAN 118 can include a controller computing device (CCD) 906 configured to gather metrics from the plurality of Access Points (APn) and compute a coverage quality (CQ) score for each client device and a network CQ score for the LAN 118. According to exemplary embodiments of the present disclosure, the CQ score is a measure of the data downstream rate from the Access Points to the client devices.

According to exemplary embodiments of the present disclosure, the CCD 906 is configured to gather link quality measurements and perform analysis on the gathered metrics for computing a CQ Score for each client device (STAn) and the network (LAN) 102. The CQ score is an intuitive score having an adjustable threshold associated with each score value. A single data point includes the measurement of Wi-Fi link quality between a given client device (STAn) and the access point (APn) with which it is connected. The CCD 906 can be configured to obtain link quality measurement for each client device (STAn) associated with the network.

To obtain the link quality measurements the CCD 706 is configured to establish a plurality of timing (e.g., sampling)

intervals for acquiring data and/or analyzing data. For example, the link quality measurements are acquired during a sampling interval set according to the parameter CQSampleInterval. The CCD 706 is configured with one or more timers, which are initialized to define one or more sample rates at which to sample each client device communication link for MCS rates and byte counts. The CCD 906 can also be configured to establish a scoring interval (STACQScoreInterval) which includes the initializing of one or more timers or counters to track the acquisition of a set number of samples. The STACQScoreInterval is the time period over which the CQ score is calculated for each client device (STAn) and the CQ score and link quality data is archived in CQ data tables stored in memory subsystem 212. In embodiments, the STACQScoreInterval may be set to periods on the order of 1 to 30 seconds.

To compute the CQ score for the LAN 118 (e.g., network), the CCD 906 is configured to initialize a set of timers or counters for establishing the network scoring interval (NetworkCQScoreInterval). The NetworkCQScoreInterval is the interval over which the overall network coverage score is calculated. The CCD 906 can also be configured to initialize a STATimeoutInterval to remove stale STAs from statistical tracking in the CQ data tables (e.g., STAArchive and STA-Metric Tables). The STATimeoutInterval is the timeout interval after which a client device is completely removed from the CQ data tables if it has not been active during this time period. It should be apparent that the CCD 706 can include any of a number of other parameters and/or intervals for acquiring data and computing the CQ score as desired.

At startup or system reset, all variables and parameters are initialized to default values. For example, all CQ data table entries (e.g., STAMetricsTable and STABinTable) can be removed to free up memory. The parameter, NumberOfSTAs which defines the number of client devices connected to the LAN 118 can be initialized to zero. The parameter, CurrentSTACQScoreCount, which defines the current sample period count in client device metric data gathering can be initialized to zero. All NetworkTables, NetworkArchiveTables, STArchiveTables, and STABinArchiveTables can be removed and the memory space freed (as necessary). Once any existing or previous tables are removed, one or more data tables, e.g., NetworkTable, with zero values for data entries can be created. A pointer to the created NetworkTable can be placed in a CurrentNetworkTable. The parameter NumberOfNetworkCQTableEntries, which is a calculated value for the number of archive tables to create and maintain, and the parameter NetworkArchiveTable, which is a table for collecting and storing client device metrics, can have entries created, zeroed and linked to the CurrentNetworkTable. A pointer is created NetworkArchiveTableEntry and placed in CurrentArchiveTable. The parameter NetworkScore, which represents the most recently calculated network score for the STACQScoreInterval, and the parameter DailyNetworkScore which represents the average network score across a previous 24 hour period can be reset to zero. The parameter CQSampleInterval can be initialized and set to the value determined or computed for obtaining link quality measurements.

The CCD 906 is configured to receive a plurality of link quality measurements associated with each client device (STAn) when the client device is wirelessly associated with an access point APn on LAN 118 during a sampling interval (CQSampleInterval). For each associated client device, the CCD 106 can be configured to obtain (e.g., receive) data points including link quality measurements and link usage measurements after initializing the one or more timers and/or counters for defining the sampling interval (CQSampleInterval) for sampling each client device. According to an exemplary embodiment, the link quality measurement included in the data points can encompass a plurality of data elements representing a combination of metrics associated with the communication link between a client device (STAn) and its associated access point (APn). For each client device discovered on the network and/or listed in a network device table, the link quality and link usage measurements can include data elements such as a MAC Address, an active status indicator, and values for: a number of bytes sent over the communication link, an MCS setting for the communication link, and a downlink data rate over the communication link. These data values and others associated with the CQ score computation can be stored in one or more CQ data tables of memory subsystem 212.

The CCD 906 is configured to iteratively assign each of the one or more data points to one of a plurality of link quality bins based on a consolidated measure of the link quality measurement and a link usage measurement included in the one or more data points. According to an exemplary embodiment of the present disclosure, the consolidated measure can include a Modulation Coding Scheme (MCS) of the communication link associated with each of the one or more data points. For example, each link quality bin is associated with an MCS index value such that the MCS coding scheme used for data communication over a subject communication link determines to which link quality bin the data point will be assigned. As each data point is received, the CCD 906 is configured to weight each data point based on at least one metric included in the link quality measurement and associated with a data rate of the link. Based on the weighting result, the CCD 906 determines whether to assign the one or more data point to the appropriate link quality bin or discard the one or more data point. The count for a link quality bin is incremented based on the link usage measurement of the client device. According to an exemplary embodiment of the present disclosure, the link usage measurement can include an active status and/or a data usage measurement for the client device. For example, the active status and the data usage measurement or value for the number of bytes sent over the communication link are compared to previous values for the link quality bin to determine how the data point should be weighted.

If the client device (STAn) is determined to be active for the sampling interval and the number of data bytes communicated during the sampling interval (CQSampleInterval) meets or exceeds a specified threshold, then the data point is given more weight relative to other data points that are inactive or do not meet the data usage threshold, and the link quality bin to which the data point is assigned is incremented. According to an exemplary embodiment, the link usage measurement can also take into account a usage frequency of the client device during the sampling interval. That is, a data point can be afforded more weight such that the link quality bin is incremented when the usage frequency of the client device meets or exceeds a specified threshold. The usage frequency metric can be used alone or in combination with other link quality metrics such as the number of data bytes communicated during the sampling interval (CQSampleInterval). On the other hand, if the client device is determined to be inactive for the current sampling interval and/or the link usage measurement indicates there is no change in the number of data bytes communicated over the link or the change in the number of data bytes communicated over the link does not meet the predetermined threshold, then the data point is ignored or given little weight as compared to client devices with an active status during the sampling interval or which have a link usage measurement, such as data usage, which meets or exceeds the specified threshold. As a result, the count for the link quality bin is not incremented.

When the sampling interval (CQSampleInterval) for obtaining the link quality measurement for one or more client devices is complete, the CCD 906 initiates a CQ Score calculation interval to compute a coverage quality score based on a ratio of a total count of weighted link quality measurements (e.g., data points) in at least one of the plurality of link quality bins to a total count of weighted link quality measurement (e.g., data points) in all of the link quality bins. For example, the CCD 906 computes coverage quality scored based on an average link quality metric computation according to:

$$cQ[m] = \sum_{i=1}^{k}\left(\frac{1}{n}\sum_{j=1}^{n}ql_i(j)\right) * \% \text{ occurrence}(ql_i) \quad (8)$$

Where m represents the client device, n represents the number of sampling intervals, ql represents the link quality bin, and k represents the number of link quality bins.

According to an exemplary embodiment, the accumulated values taken at each sample interval at each MCS rate across the interval are scaled on a per Bin Basis according to the following:

```
For (m = 0; m <= 9; m++) {
    wbin.{m} = BinTableEntry.{m}.BinCount / bTotal * CQScoreScaler.
}
``` where m=the MCS value (0-9), bTotal is the sum of all bin counts, and CQScoreScaler is a value (e.g., a factor of 10) used to scale the calculated CQ Scores to within a range of values determined by the designated link quality bins (e.g., MCS values).

The CQ Score calculation measures a percentage of bits passed at each individual MCS rate verses the total bits passed during the sampling interval.

The STA CQ Score, is a coverage quality score computed for each client device during the sampling interval according to the following:

$$BinScaler = CQScoreScaler/10 \quad (9)$$

$$STACQScore = \left(\sum_{m=0}^{9} wbin.\{m\} * BinScaler * (m+1)\right) - BinScaler$$

where m=the value for a Bin, MCS index value. The CCD 106 can also compute a CQ score for the network across multiple client devices according to:

$$cQ_{avg} = \frac{1}{m}\sum_{i=1}^{m} cQ[m] \quad (10)$$

$$CQ \text{ Score} = k * CQ_{avg} \quad (11)$$

where m represents the number of client devices and k is a normalizing constant for the link quality bins.

Figure 10B:
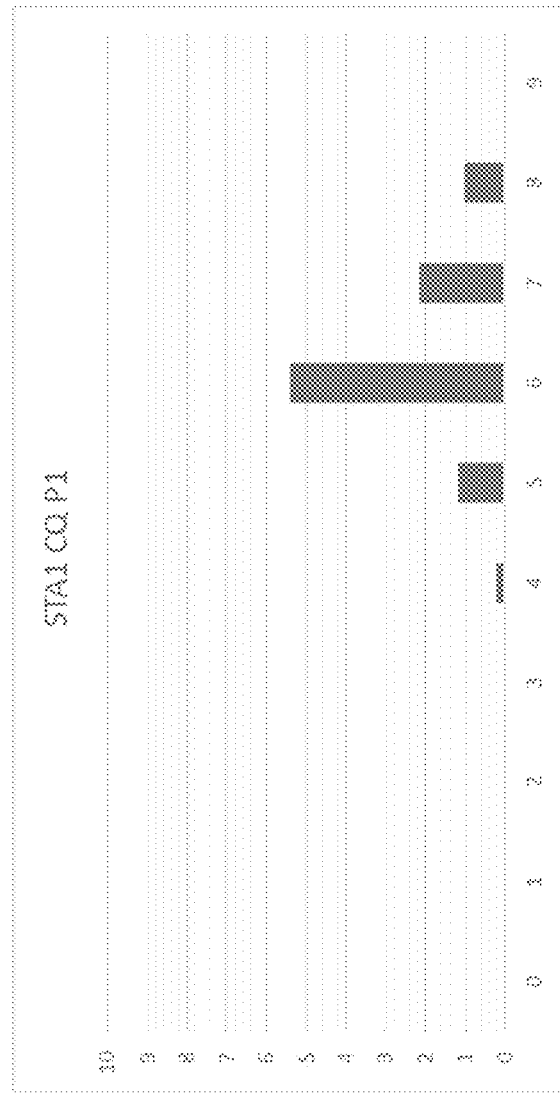
Figure 10C:
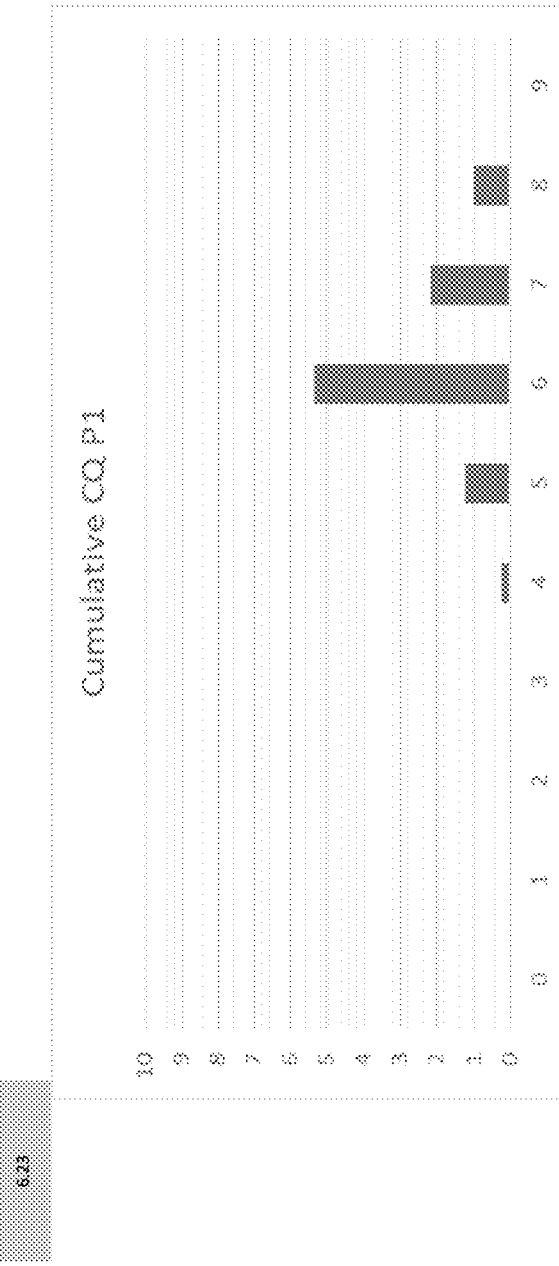

FIGS. 10A-10C illustrate CQ data tables and measurement histograms in accordance with an exemplary embodiment of the present disclosure.

FIG. 10A shows the data obtained by the CCD 906 for each link quality and link usage measurement during a sampling interval. While FIG. 10A only shows metrics for a single client device over a one sampling interval, it should be understood by one of skill in the relevant art and from the exemplary embodiments of the present disclosure that a plurality of sampling intervals can be performed for each client device (STAn). According to an exemplary embodiment, link quality measurement data can be accumulated and allocated to the link quality bins regularly, with the frequency to be determined based on a movement vector of each individual client device. The movement vector defining a direction and magnitude of motion of a client device relative to the coverage area 904. The data obtained in the link quality and link usage measurements for each client device can be stored in CQ data tables, which can be stored in memory and/or a database associated with the CCD 906.

As shown in FIG. 10A, the CCD 906 can populate various entries (e.g., parameters, metrics, etc.) in the CQ table for each client device (STAn) based on the data provided in the link quality and link usage measurements or computed based on the link quality and link usage measurements. For example, the CCD 906 can populate or compute values for the client device number (STAn) on the LAN 118. The ACTIVE parameter is a Boolean value which indicates whether the client device was active during any part of the sample period. The LastByteCount parameter indicates the last cumulative byte count recorded while the client device was active. The NumberofMCSMeasurements parameter is an incremented value indicating the number MCS measurements obtained. The Reported MCS value is the MCS value used on the link for data communication at the time of the sample, and the Reported Bytes value indicates the cumulative number of bytes for each sample interval. FIG. 10A also illustrates the allocation of the byte count to the bins associated with the Reported MCS value. The weighted score for each data point during the sample period is obtained according to:

```
bits = (bytes * 8) / MCSSampleInterval
If bits > BitPerSampleLimit Then bits = BitPerSampleLimit
If bits = 0 then
    Scaled Value = 0
Else
    ScaledValue = bits / ThruPutWeightScaler
End If
SStaCqScore = Round((ScaledValue), 2)
```

The parameter ThruPutWeightScaler is a value used to weight the throughput of link quality measurements during each sampling interval. According to an exemplary embodiment, the scaled value is provided in bits per second (bps).

According to another embodiment an additional weighting adjustment can be made to the sample based on the QoS markings of the data being transferred to the client device STAn. The modifier to the weighted sample can correspond with Differentiated Services Code Point (DSCP) markings, Class of Service (CoS) markings, or WMM Data Queues. Application of an additional weight adjustment to one or more data points received can be based on the service being provided to the client device STA. This weight is in addition to the byte count weight and can serve as a multiplier to the original weighting of a data point. The additional weighting adjustment can be made according to:

```
Bits = (ByteCount * 8) / SampleInterval    // Gives a bits per second
  for the sample period
If Bits > SampleUpperLimit then Bits = SampleUpperLimit
If Bits <= SampleLowerLimit then Bits = 0
  Scaled Value = Bits / ThroughputWeightScaler
  Scaled Value = ScaledValue * QoS_Adjustment_Scaler
  StaCqScore = Round(ScaledValue,2)
```

According to an exemplary embodiment, the sampled and weighted score (SStaCqScore) is then accumulated into a sample bin for the STA based on the sampled or inferred MCS value for the sample according to the following:

$$STABinTable[SampleMCSRate] \cdot BinCount += SStaCqScore \qquad (12)$$

Where SampleMCSRate=the actual or inferred MCS value for the sample MCS value.

FIG. 10B illustrates a table showing an exemplary CQ score and histogram for a client device in accordance with an exemplary embodiment of the present disclosure. As shown in FIG. 10B, the CQ Score for each link quality bin (0-9) is determined based on the total byte count for the bin relative to the total number of bytes communicated. For example, for each client device the total for all entries in the Bin Table are summed according to:

$$bTotal = \sum_{b=0}^{9} STABinTable.\{b\}.BinCount$$

```
If (bTotal == 0)/* the STA was inactive for the period*/
{
  STAArchiveTableEntry.STACQScore = -1
  STAArchiveTableEntry.Active = FALSE
  STAArchiveTableEntry.ByteCount = 0
  // perform STA Removal Check as defined below.
}
Else
Calculate STACQScore
```

According to an exemplary embodiment, at the CQScore Interval the CCD 906 initiates a series of calculations which determines the CQ Score for individual STA devices.

According to an exemplary embodiment, the accumulated values taken at each sample interval at each MCS rate across the interval are scaled on a per Bin Basis according to the following:

```
For (m = 0; m <= 9; m++)   {
  wbin[m] = STABinTable[m].BinCount / bTotal * CQScoreScaler.
}
```

Where m=the bin value (0-9), bTotal is the sum of all bin counts for the STA per the equation above, and CQScoreScaler is a value (e.g., a factor of 10) used to scale the calculated CQ Scores to within a range of values determined by the designated link quality bins (e.g., MCS values). The purpose of this calculation is to determine a scaled percentage value of the total on a per bin basis.

According to an exemplary embodiment, the individual Station CQ Score is then calculated according to Equation (9) as follows:

$$BinScaler = CQScoreScaler/10$$

$$STACQScore = \left(\sum_{m=0}^{9} wbin[m] * BinScaler * (m+1)\right) - BinScaler$$

Where m=the value for a Bin, MCS index value, and BinScaler is as defined.

Once the CQ Score for each client device STA is calculated, the processing device 202 can generate a data signal encoded with the STACQScores.

According to an exemplary embodiment of the present disclosure, the CCD 106 can also be configured to determine whether the CQ score for a client device indicates a bad or poor communication link or a faulty or underperforming client device. For this determination, the CCD 106 compares the STACQScore for each client device (STAn) to a BadSTAThreshold. If the STACQScore is above the BadSTAThreshold value, then the STACQScore is deemed to be good. On the other hand, if the STACQScore is below the BadSTAThreshold value, then the STACQScore is bad and the CCD 106 sets a BadStaFlag to TRUE, which indicates that the client device (STAn) and/or communication link associated with the client device (STAn) is performing poorly.

The CCD 906 is configured to discard a data point or link quality measurement associated with at least one metric of the link quality measurement of the mobile computing device, such as when the data usage below a predetermined threshold. For example, if the sum of all calculated bin counts (bTotal) is zero, then the CCD 106 determines the amount of time passed since valid data has been received for the client device (STAn). If the amount of time exceeds a predetermined threshold, such as if a sum of the time stamps of the last metrics received for the client device and the specified timeout interval exceeds a specified threshold (e.g., one (1) day) then the client device may be completely removed from the CQ data tables and a value indicating the number of client devices connected to the network is decremented. The timestamp of the client device is only updated if valid metrics are received and/or recorded in the database. A client device can discarded from the CQ data table based on the link usage measurements, such as under circumstances in which a client device has no transfer or communication of data bytes with the access point (APn). For example, a user is mowing the lawn, and has a smartphone on their person to receive calls, but little or no data is transferred to or from the network by the smartphone. In another example, a client device can be moving towards the edge of the coverage area and/or out of the coverage area due to a user driving away in a vehicle. As the distance from the one or more access points of the LAN 118 increases and the number of data bytes communicated over a link decreases, the link-quality-metric for the client device decreases until the device completely dissociates from the one or more access points of the LAN 118.

Once all the client devices in the database have been processed based on their activity, a final network coverage score for the period can be calculated. FIG. 10C illustrates a NetworkTable including data entries for calculating an Average NetworkCQScore in accordance with an exemplary embodiment of the present disclosure. The final network CQ score is based on the link quality and link usage measurement data obtained over the sampling interval for each client device connected to the LAN 118. In calculating the final network coverage score network bin totals (TOTALS) for the sampling interval are calculated according to:

$$\text{For}(i = 0;\ i <= 9;\ i++) \quad (13)$$

$$\left\{ \text{NetworkBin}[i].\text{BinCount} = \sum_{s=1}^{STACnt} STABinTable[s][i].BinCount \right\}$$

Where i=the number of link quality measurement bins[0-9], s is a station which is active in the network, and STACnt=the total number of stations on the network.

Next total network count is attained per the following.

$$\text{NetworkTotal} = \sum_{b=0}^{9} NetworkBin\{b\}.BinCount \quad (14)$$

Where b=the number of link quality measurement bins.
Next, the link quality bin percentage values for the network are calculated according to:

```
For (m = 0; m <= 9; m++)    {
  wbin.{m} = (NetworkBin(m) / NetworkTotal) * CQScoreScaler.
}
``` where m=the MCS value (0-9), NetworkTotal is the sum of all Network bin counts, and CQScoreScaler is a value (e.g., a factor of 10) used to scale the calculated CQ Scores to within a Range of Values determined by the MCS values (0-9).

The CCD 906 is configured to calculate the NetworkCQScore according to the following:

$$\text{BinScaler} = CQScoreScaler/10 \quad (15)$$

$$\text{NetworkCQScore} = \left( \sum_{m=0}^{9} wbin.\{m\} * BinScaler * (m+1) \right) - BinScaler$$

The CCD 906 compares the NetworkCQScore against a threshold value (BadNetworkThreshold) to determine whether the network coverage is suitable. That is, the BadNetworkThreshold is a threshold value for determining whether the CQ score indicates that the overall coverage for a network is bad. After the NetworkCQScore is computed it can be compared against the BadNetworkThreshold. According to an exemplary embodiment, the threshold value can be a lower limit having a default value of 4, for example, such that if the NetworkCQScore is less than the predetermined BadNetworkThreshold value, then the Network Table is updated with a bad network flag. If the bad network flag is set, diagnostic tests can be scheduled and/or performed on the network as desired. The CCD 706 determines whether a network score interval has expired. If the network score interval has expired, an average network score can be calculated across all previously gathered and stored data for the network by averaging all current NetworkTable AverageNetworkCQScore values.

Figure 11A:
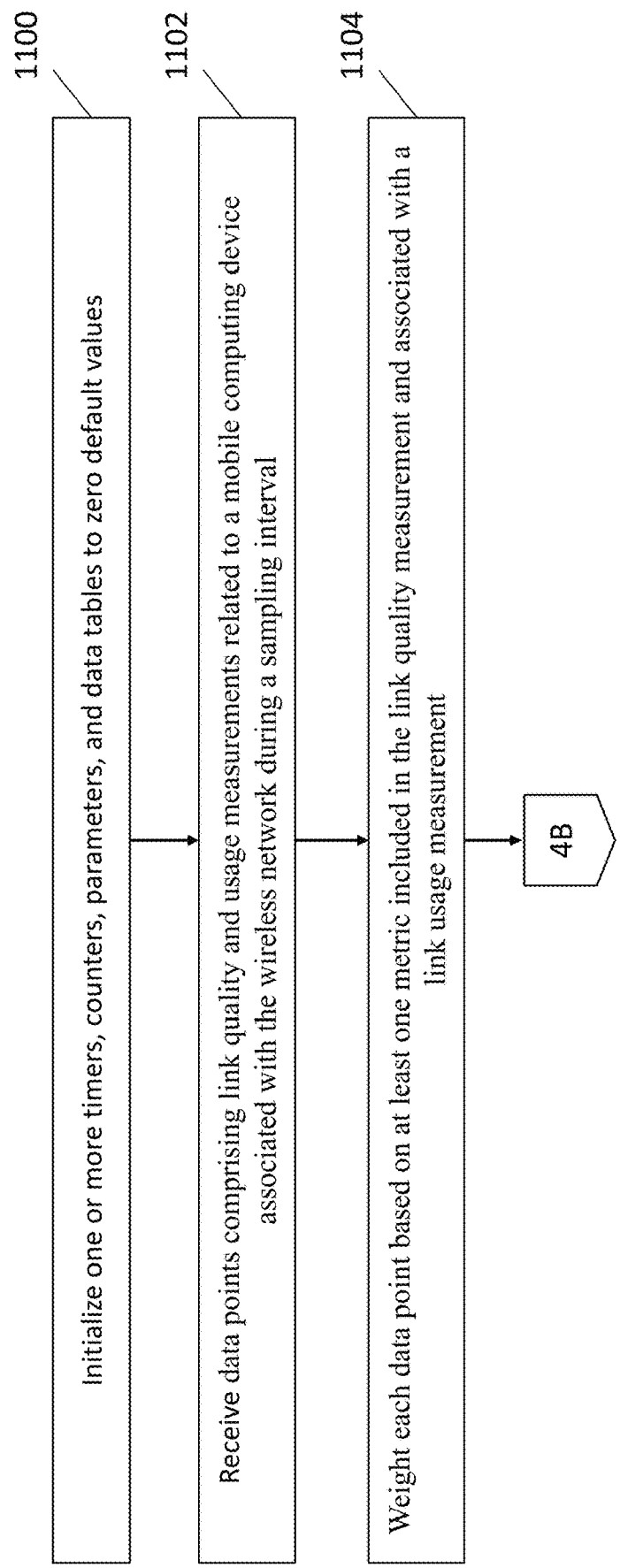
FIGS. 11A-11C illustrate a flow diagram for determining quality of coverage in a wireless network in accordance with an exemplary embodiment of the present disclosure.
Figure 11B:
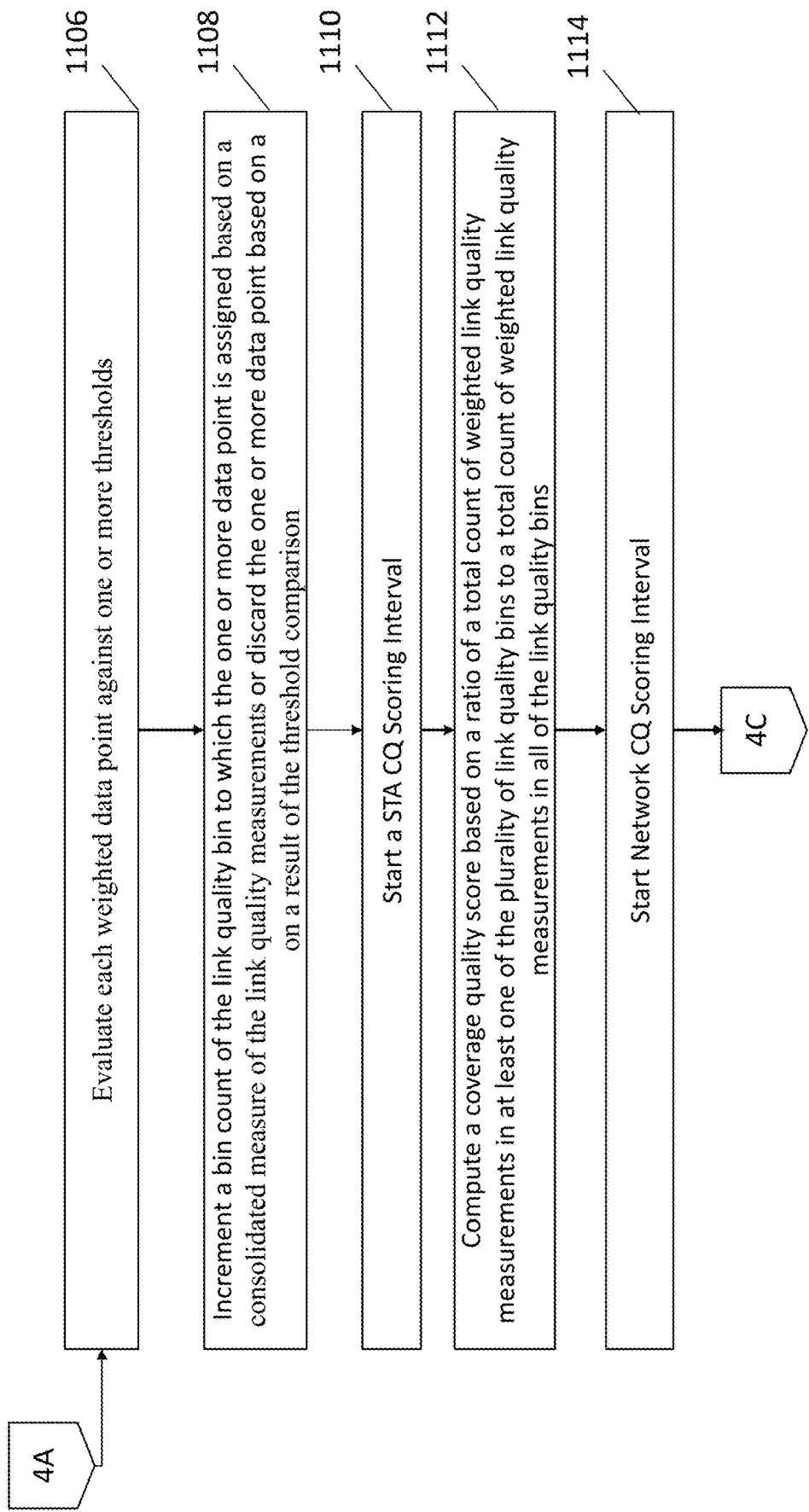
Figure 11C:
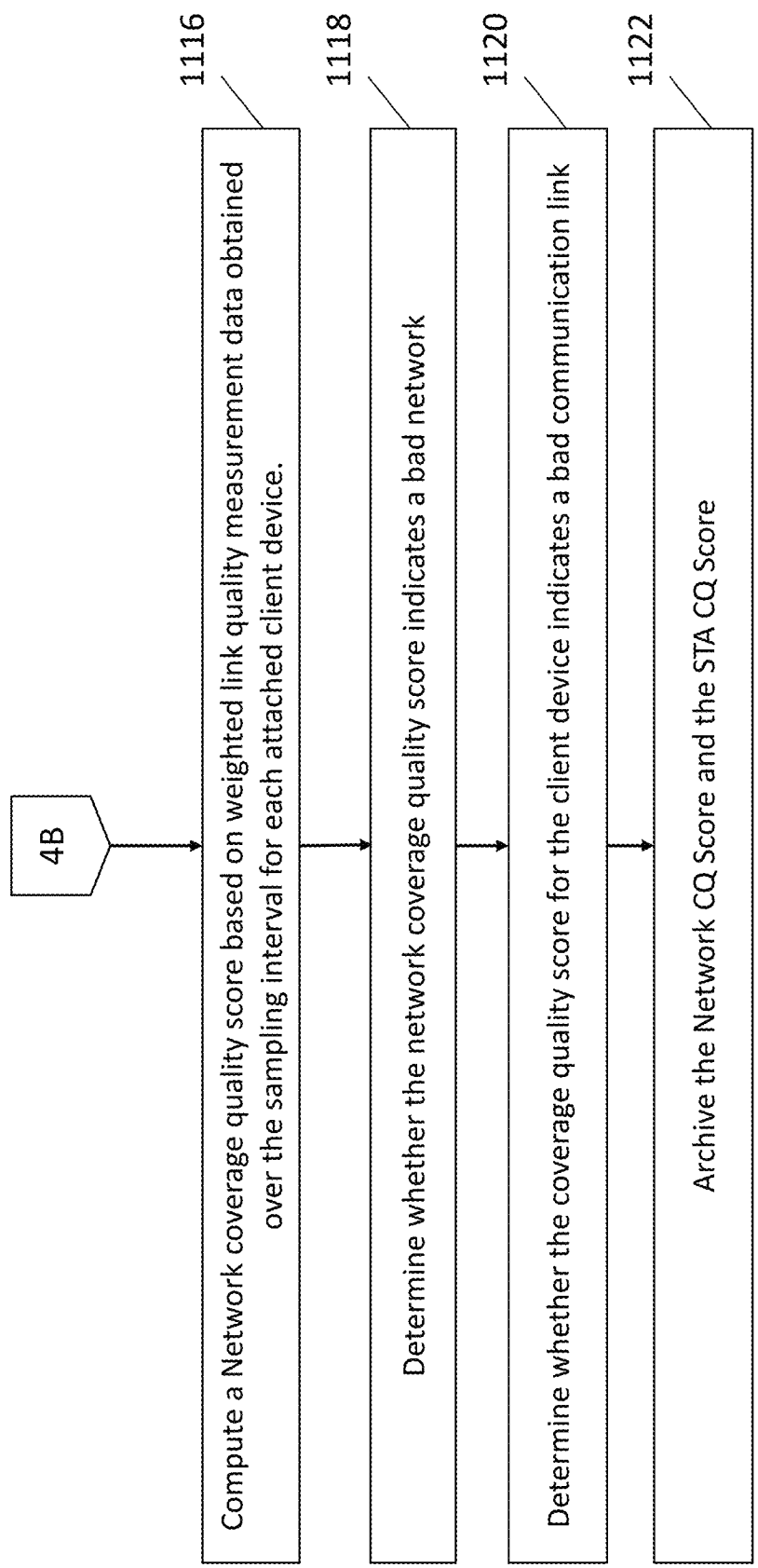

FIGS. 11A-11C illustrate a flow diagram for determining quality of coverage in a wireless network in accordance with an exemplary embodiment of the present disclosure.

As shown in FIG. 11A, the CCD initializes one or more timers, counters, parameters, and data tables to zero default values (Step 1100). The networking subsystem 214 receives, via the antenna 220, a plurality of data points comprising link quality and usage measurements related to a mobile computing device associated with the wireless network during a sampling interval (Step 1102).

The link quality and link usage measurements include a plurality of data elements, such as a MAC Address, an active status indication, a number of bytes sent over the communication link, an MCS index for the communication link, and a downlink data rate over the communication link. As the CCD 906 obtains each link quality and link usage measurements over the sampling interval (CQSampleInterval), the CCD 906 can increment a count for each link quality bin when a link quality measurement or data point is assigned. Prior to incrementing the bin count, however, the CCD 906 determines a weight that is to be allocated to the newly assigned data point (Step 1104). That is, the CCD 906 computes a weight for each data point based on at least one metric included in the link quality measurement and associated with the link usage measurements. Once computed, the CCD 906 evaluates each weighted data point against one or more data usage thresholds (Step 1106). For example, the CCD 906 analyzes the active status value and number of bytes sent by the client device since the last sampling interval. If the consolidated measure of the client device includes an active status for the sampling period, shows an increase in the cumulative number of data bytes that meets or exceeds a specified threshold, or a usage frequency (e.g., data usage) of the client device meets or exceeds a predetermined threshold then the data point is given weight and the link quality bin to which it is assigned is incremented (Step 1108). On the other hand, if the consolidated measure of the client device includes an inactive status for the sampling period, there is no change in the number of data bytes communicated over the link or the change in the number of data bytes does not meet the predetermined threshold, or the usage frequency of the client device does not meet or exceed a predetermined threshold, then the data point is ignored (e.g., discarded) or given little weight as the count for the link quality bin is not incremented (Step 1108).

When the sampling interval is complete, the timer for STA CQ Scoring Interval is started (Step 1110). During the STA scoring interval, the CCD 906 computes, for each client device having data obtained during the scoring interval, a CQ score based on a ratio of a total count of weighted link quality measurements or data points in at least one of the plurality of link quality bins to a total count of weighted link quality measurements or data points in all of the link quality bins (Step 1112). The CQ score for each link quality bin is determined based on the total byte count for the bin relative to the total number of bytes communicated. Once the scoring interval for each client device is complete, the CCD 906 can start the timer for the Network CQ Scoring Interval (Step 1114). The final network coverage quality score is computed based on the link quality measurement data obtained over the sampling interval for each client device (STA1, STA2, STA3) connected to the LAN 118 (Step 1116). After computing the network coverage quality score, the CCD 906 can determine whether the score indicates a bad network, by comparing the NetworkCQScore to a predetermined value which indicates a bad network then the Network Table is updated with a bad network flag (Step 1118). The CCD 106 can also determine whether the CQ Score for each client device across the sampling interval indicates a bad communication link or client device (Step 1120). The CQ Scores for each client device (STAn) and the network can be archived or stored in memory subsystem 212 or a database (Step 1122).

The architectures and operations of CCD 906, Access Points (APn), and client devices (STAn) as described are exemplary only. It is understood that other computer architectures and operational constraints for facilitating data communication on a network can be used. It is further understood that any of the CCD 906 and Access Points (APn) can include other circuitry and operating modules, such as data compressors, buffers, scramblers, clocks, filters, analog to digital converters, signal processors, data encryption devices etc. to improve or tailor the functionality of the CCD 906 and Access Points (APn) and/or facilitate meeting a desired design objective according to exemplary embodiments of the present disclosure.

According to exemplary embodiments the functional operations described herein can be provided in digital electronic circuitry, or in computer software, firmware, or hardware, including the structures disclosed in this specification and their structural equivalents, or in combinations of one or more of them. Some embodiments of the subject matter of this disclosure, and components thereof, can be realized by software instructions that upon execution cause one or more processing devices to carry out processes and functions described above. Further embodiments of the subject matter described in this specification can be implemented as one or more computer program products, i.e., one or more modules of computer program instructions encoded on a tangible program carrier for execution by, or to control the operation of, data processing apparatus.

One or more exemplary computer programs (also known as a program, software, software application, script, or code) for executing the functions of the exemplary embodiments disclosed herein, can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

In some embodiments, the processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be In some embodiments, an apparatus or device embodying the invention may be in the form of a gateway, an access point, a set-top box or other standalone device, or may be incorporated in a television or other content playing apparatus, or other device, and the scope of the present invention is not intended to be limited with respect to such forms.

Components of some embodiments may be implemented as Integrated Circuits (IC), Application-Specific Integrated Circuits (ASIC), or Large Scale Integrated circuits (LSI), system LSI, super LSI, or ultra LSI components. Each of the processing units can be many single-function components, or can be one component integrated using the technologies described above. Components may also be implemented as a specifically programmed general purpose processor, CPU, a specialized microprocessor such as Digital Signal Processor that can be directed by program instructions, a Field Programmable Gate Array (FPGA) that can be programmed after manufacturing, or a reconfigurable processor. Some or all of the functions may be implemented by such a processor while some or all of the functions may be implemented by circuitry in any of the forms discussed above.

It is also contemplated that implementations and components of embodiments can be done with any newly arising technology that may replace any of the above implementation technologies.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, where operations are depicted in the drawings in a particular order, this should not be understood as requiring that such operations be performed in the particular order shown or in sequential order unless otherwise noted, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

While the preceding discussion used Wi-Fi and/or Ethernet communication protocols as illustrative examples, in other embodiments a wide variety of communication protocols and, more generally, adaptive balancing techniques may be used. Thus, the adaptive balancing technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the adaptive balancing technique may be implemented using program instructions, operating system (such as a driver for interface circuit) or in firmware in an interface circuit. Alternatively or additionally, at least some of the operations in the adaptive balancing technique may be implemented in a physical layer, such as hardware in an interface circuit.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication technique, different numerical values may be used.

The foregoing description is intended to enable any person skilled in the art to make and use the disclosure and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

Having described the invention in detail, it will be understood that such detail need not be strictly adhered to, but that additional changes and modifications may suggest themselves to one skilled in the art.

What is claimed is:

1. A method for determining quality of coverage in a wireless network, comprising:
   receiving data points, in a communication interface of a computing device, the data points comprising link quality and link usage measurements related to a mobile computing device associated with the wireless network during a sampling interval;
   weighting, in the processing device of the computing device, each data point based on at least one metric included in the link quality measurements and associated link usage measurement;
   evaluating, in the processing device of the computing device, each weighted data point against one or more thresholds, wherein a weighted data point is discarded based on a result of the threshold comparison or assigned to one of a plurality of link quality bins based on a consolidated measure of the link quality measurements; and
   computing, in the processing device of the computing device, a coverage quality score based on a ratio of a total count of weighted data points in at least one of the plurality of link quality bins to a total count of weighted data points in all of the link quality bins.

2. The method of claim 1, wherein the consolidated measure of the link quality measurements corresponds to a Modulation Coding Scheme of a communication link associated with the data point.

3. The method of claim 1, comprising:
   building a dynamic range map including one or more data points of the mobile computing device.

4. The method of claim 1, wherein the link usage measurement measures data usage on a communication link for each data point.

5. The method of claim 4, comprising:
   discarding a data point when the link usage measurement is below a predetermined data usage threshold.

6. The method of claim 1, wherein the at least one metric included in the link quality measurement is based on a signal-to-noise ratio of the communication link and physical details of the communication link.

7. The method of claim 1, wherein the at least one metric included in the link quality measurement includes movement of the mobile computing device at an edge or toward an edge of the coverage area, the method comprising:
   discarding a data point assigned to a link quality bin if at least a measured distance of the mobile computing device from the access point is above a distance threshold.

8. The method of claim 7, wherein weighting each data point according to at least one metric included in the link quality measurement comprises:
   assigning a lower weight to the data point of the mobile computing device, if the at least one metric included in the link quality measurement indicates movement of the mobile computing device at an edge or toward an edge of the coverage area, and a measured distance of the mobile computing device from the access point is above a predetermined distance threshold.

9. The method of claim 1, wherein the link usage measurement measures data usage on the communication link of each data point, the method comprising:
   discarding a data point associated with a mobile computing device because no data activity is observed during the sampling interval.

10. The method of claim 1, wherein the link usage measurement indicates whether the mobile device is active during the sampling interval.

11. A system for determining quality of coverage in a wireless local area network, comprising:
    a communication interface configured to receive data points comprising link quality and usage measurements related to a mobile computing device associated with the wireless network during a sampling interval; and
    a processing device configured to:
    weight each data point based on at least one metric included in the link quality measurement and associated with a link usage measurement;
    evaluate each weighted data point against one or more thresholds, wherein a weighted data point is discarded based on a result of the threshold comparison or assigned to one of a plurality of link quality bins based on a consolidated measure of the link quality measurements; and
    compute a coverage quality score based on a ratio of a total count of weighted link quality measurements in at least one of the plurality of link quality bins to a total count of weighted link quality measurements in all of the link quality bins.

12. The system of claim 11, wherein the link usage measurement measures data usage on a communication link of each data point.

13. The system of claim 11, wherein the processing device is configured to discard at least one of the one or more data points when the link usage measurement is below a predetermined threshold.

14. The system of claim 11, wherein the at least one metric of the link quality measurement includes at least a direction of movement.

15. The system of claim 14, wherein the processing device is configured to discard at least one data point of the one or more data points when the direction of movement of the mobile computing device includes movement at an edge or towards an edge of the coverage area.

16. The system of claim 15, wherein the at least one metric of the link quality measurement includes a measured distance between the mobile computing device and the access point is above a distance threshold.

17. The system of claim 11, wherein the link usage measurement indicates whether the mobile computing device is active during the sampling interval.

18. The system of claim 17, wherein the processing device is configured to discard at least one data point of the one or more data points if the mobile computing device is not active on the wireless network during at least the sampling interval.

19. The system of claim 11, wherein the link usage measurement includes measures data usage of a communication link of each data point, the processing device being configured to increment a count value for one or more link quality bins when a data point having data usage above a predetermined threshold is deposited into the one or more link quality bins.

20. The system of claim 11, wherein the consolidated measure of the link quality measurements corresponds to a Modulation Coding Scheme of a communication link associated with the data point.

* * * * *